United States Patent
Chikugo et al.

(10) Patent No.: US 10,930,946 B2
(45) Date of Patent: Feb. 23, 2021

(54) FUEL CELL SYSTEM AND CONTROL DEVICE THEREFOR, AND CONTROL METHOD FOR FUEL CELL SYSTEM

(71) Applicant: NISSAN MOTOR CO., LTD., Yokohama (JP)

(72) Inventors: Hayato Chikugo, Kanagawa (JP); Yousuke Tomita, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 202 days.

(21) Appl. No.: 16/084,652

(22) PCT Filed: Nov. 28, 2016

(86) PCT No.: PCT/JP2016/085173
§ 371 (c)(1),
(2) Date: Sep. 13, 2018

(87) PCT Pub. No.: WO2017/158939
PCT Pub. Date: Sep. 21, 2017

(65) Prior Publication Data
US 2019/0074526 A1 Mar. 7, 2019

(30) Foreign Application Priority Data
Mar. 15, 2016 (JP) .............................. JP2016-051472

(51) Int. Cl.
*H01M 8/04089* (2016.01)
*H01M 8/04537* (2016.01)
(Continued)

(52) U.S. Cl.
CPC ... *H01M 8/04104* (2013.01); *H01M 8/04097* (2013.01); *H01M 8/04179* (2013.01);
(Continued)

(58) Field of Classification Search
None
See application file for complete search history.

(56) References Cited

U.S. PATENT DOCUMENTS

| 8,927,161 B2 | 1/2015 | Kobayashi |
| 2009/0035630 A1 | 2/2009 | Kumada et al. |

(Continued)

FOREIGN PATENT DOCUMENTS

| JP | 2006-49202 A | 2/2006 |
| JP | 2008-131633 A | 6/2008 |

(Continued)

OTHER PUBLICATIONS

JP 2009245800 English translation. Ando et al. Japan. Oct. 22, 2009. (Year: 2009).*

*Primary Examiner* — Christopher P Domone
(74) *Attorney, Agent, or Firm* — Foley & Lardner LLP

(57) ABSTRACT

A fuel cell system includes an anode gas supply device configured to supply an anode gas to a fuel cell and an ejector configured to merge an anode discharged gas, discharged from the fuel cell; with the anode gas to be supplied to the fuel cell. The fuel cell system includes an actuator configured to supply the anode discharged gas to the ejector and a cathode gas supply device configured to supply a cathode gas to the fuel cell. A control method for A fuel cell system includes a cathode gas control step of controlling a pressure of the cathode gas to be supplied to the fuel cell according to a magnitude of a load that is required of the fuel cell, and an anode gas control step of increasing a differential pressure between the pressure of the cathode gas and a pressure of the anode gas by the anode gas supply device when the load is low compared to when the load is high.

12 Claims, 21 Drawing Sheets

(51) Int. Cl.
*H01M 8/04746* (2016.01)
*H01M 8/04119* (2016.01)

(52) U.S. Cl.
CPC ... *H01M 8/04611* (2013.01); *H01M 8/04619* (2013.01); *H01M 8/04626* (2013.01); *H01M 8/04753* (2013.01); *H01M 8/04783* (2013.01); *H01M 2250/20* (2013.01)

(56) References Cited

U.S. PATENT DOCUMENTS

| | | | | |
|---|---|---|---|---|
| 2012/0141891 A1* | 6/2012 | Kwon | ............... | H01M 8/04097 |
| | | | | 429/415 |
| 2014/0349208 A1* | 11/2014 | Ikezoe | .............. | H01M 8/04201 |
| | | | | 429/446 |

FOREIGN PATENT DOCUMENTS

| | | | |
|---|---|---|---|
| JP | 2009-245800 A | 10/2009 | |
| JP | 2009-283171 A | 12/2009 | |

\* cited by examiner

FUEL CELL SYSTEM AND CONTROL DEVICE THEREFOR, AND CONTROL METHOD FOR FUEL CELL SYSTEM

TECHNICAL FIELD

The present invention relates to a fuel cell system that introduces a gas, discharged from a fuel cell, into the fuel cell for circulation, a control device for the fuel cell system, and a control method for the fuel cell system.

BACKGROUND ART

JP 2008-131633A discloses a fuel cell system including an ejector that merges an anode discharged gas, discharged from a fuel cell, with an anode gas to be supplied to the fuel cell from a tank, thereby supplying the merged gas to the fuel cell, and a pump that pressurizes the anode discharged gas for delivery to the ejector.

In this fuel cell system, in a range where the load of the fuel cell is higher than that in a low load range, the pump is driven to increase the pressure of the anode discharged gas, and further, the pressure of the anode gas to be supplied to the ejector is increased compared to that in the low load range so as to prevent the pressure of the anode discharged gas from being lowered in the ejector.

SUMMARY OF INVENTION

In the fuel cell system described above, when the load of the fuel cell is in the range where it is higher than that in the low load range, since the pressure of the anode gas to be supplied to the ejector is increased, there is a possibility that the supply amount of the anode gas to the fuel cell becomes excessive. In such a case, the anode gas is consumed more than necessary in the fuel cell or is required to be discharged to the outside, thus resulting in poor fuel economy.

On the other hand, when the load of the fuel cell is in the low load range, the pressure of the anode gas to be supplied to the ejector is lowered, and accordingly, the pressure increase amount of the anode discharged gas by the pump should be increased, so that electric power consumption of an actuator that drives the pump becomes large. Therefore, there is a problem that the performance of the pump should be enhanced.

The present invention has been made in view of the above-described problems and has an object to provide a fuel cell system that can reduce electric power consumption of an actuator that circulates an anode gas to a fuel cell, a control device for the fuel cell system, and a control method for the fuel cell system.

According to one aspect of the present invention, a fuel cell system includes: an anode gas supply device configured to supply an anode gas to a fuel cell; an ejector configured to merge an anode discharged gas, discharged from the fuel cell, with the anode gas to be supplied to the fuel cell; an actuator configured to supply the anode discharged gas to the ejector; and a cathode gas supply device configured to supply a cathode gas to the fuel cell. A control method for the fuel cell system includes a cathode gas control step of controlling a pressure of the cathode gas to be supplied to the fuel cell according to a magnitude of a load that is required of the fuel cell, and an anode gas control step of increasing a differential pressure between the pressure of the cathode gas and a pressure of the anode gas by the anode gas supply device when the load is low compared to when the load is high.

MODE FOR CARRYING OUT INVENTION

Hereinafter, embodiments of the present invention will be described with reference to the drawings.

First Embodiment

Figure 1:
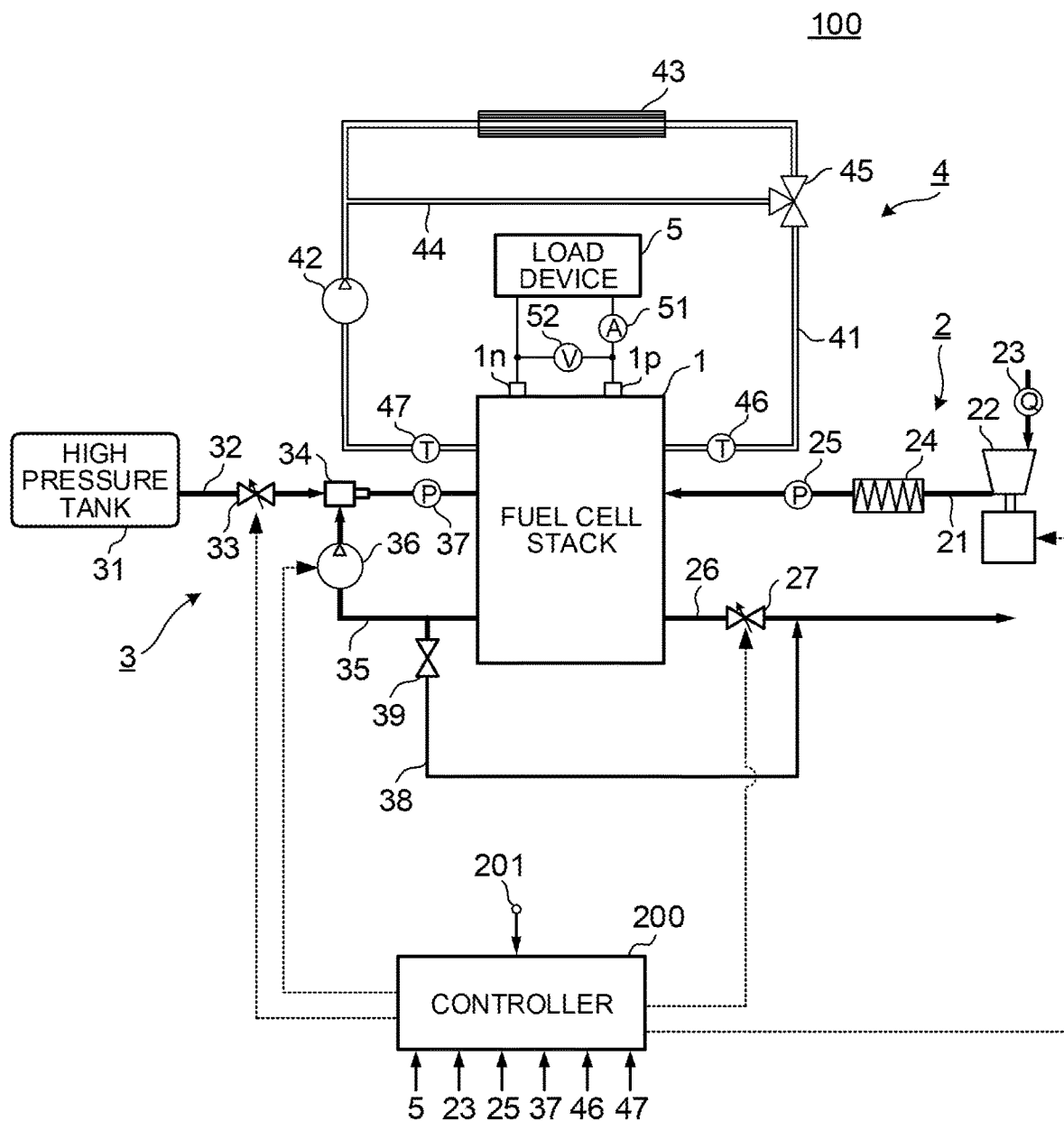
FIG. 1 is a configuration diagram showing a configuration example of a fuel cell system in a first embodiment of the present invention.

FIG. 1 is a configuration diagram showing one example of a configuration of a fuel cell system 100 in a first embodiment of the present invention.

The fuel cell system 100 constitutes a power supply system in which an anode gas containing fuel and a cathode gas containing an oxidizer, that are necessary for power generation of a fuel cell, are respectively supplied to a fuel cell stack 1, thereby causing the fuel cell to generate electric power according to an electrical load. In this embodiment, hydrogen is used as the fuel, and oxygen is used as the oxidizer. The fuel cell system 100 is mounted on, for example, an electric vehicle, a hybrid vehicle, or the like.

The fuel cell system 100 includes the fuel cell stack 1, a cathode gas supply/discharge device 2, an anode gas supply/discharge device 3, a stack cooling device 4, a load device 5, and a controller 200.

The fuel cell stack 1 is a stacked battery in which a plurality of fuel cells are stacked together. The fuel cell stack 1 is a power supply that is connected to the load device 5 and supplies electric power to the load device 5. The fuel cell stack 1 generates a DC voltage of, for example, several hundred V (volts).

The fuel cell includes an anode electrode (fuel electrode), a cathode electrode (oxidizer electrode), and an electrolyte membrane interposed between these electrodes. The fuel cell generates electric power by an electrochemical reaction between hydrogen in an anode gas supplied to the anode electrode and oxygen in a cathode gas supplied to the cathode electrode. The electrochemical reaction (power generation reaction) proceeds at the anode electrode and the cathode electrode as follows.

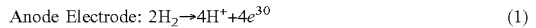

Anode Electrode: $2H_2 \rightarrow 4H^+ + 4e^{30}$ (1)

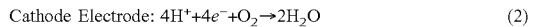

Cathode Electrode: $4H^+ + 4e^- + O_2 \rightarrow 2H_2O$ (2)

The cathode gas supply/discharge device 2 includes a cathode gas supply device that supplies a cathode gas to the fuel cell stack 1. The cathode gas supply/discharge device 2 of this embodiment supplies air containing oxygen to the cathode electrode side of the fuel cell stack 1 as a cathode gas and discharges air discharged from the cathode electrode side of the fuel cell stack 1 to the atmosphere as a cathode exhaust gas.

The cathode gas supply/discharge device 2 includes a cathode gas supply passage 21, a compressor 22, a flow rate sensor 23, an intercooler 24, a cathode pressure sensor 25, a cathode gas discharge passage 26, and a cathode pressure control valve 27.

The cathode gas supply passage 21 is a passage for supplying a cathode gas to the fuel cell stack 1. The cathode gas supply passage 21 has one end open and the other end connected to a cathode gas inlet hole of the fuel cell stack 1.

The compressor 22 is provided in the cathode gas supply passage 21. The compressor 22 takes in air from the open end of the cathode gas supply passage 21 and supplies the air to the fuel cell stack 1. The manipulated variable of the compressor 22 is controlled by the controller 200.

The flow rate sensor 23 is provided in the cathode gas supply passage 21 upstream of the compressor 22. The flow rate sensor 23 detects a flow rate of a cathode gas that is sucked and discharged toward the fuel cell stack 1 by the compressor 22. Hereinafter, the flow rate of a cathode gas that is supplied to the fuel cell stack 1 by the compressor 22 will be referred to as a "compressor flow rate". The flow rate sensor 23 outputs a signal indicative of a detected compressor flow rate to the controller 200.

The intercooler 24 is provided in the cathode gas supply passage 21 downstream of the compressor 22. The intercooler 24 cools a cathode gas discharged from the compressor 22 so as to prevent the temperature of components disposed downstream of the intercooler 24 from becoming too high.

The cathode pressure sensor 25 is provided in the cathode gas supply passage 21 between the intercooler 24 and the fuel cell stack 1. The cathode pressure sensor 25 detects a pressure of a cathode gas that is supplied to the fuel cell stack 1. Hereinafter, the pressure of a cathode gas that is supplied to the fuel cell stack 1 will be referred to as a "cathode pressure". The cathode pressure sensor 25 outputs a signal indicative of a detected cathode pressure to the controller 200.

The cathode gas discharge passage 26 is a passage for discharging a cathode gas from the fuel cell stack 1. The cathode gas discharge passage 26 has one end connected to a cathode gas outlet hole of the fuel cell stack 1 and the other end open.

The cathode pressure control valve 27 is provided in the cathode gas discharge passage 26. In this embodiment, a solenoid valve capable of changing the valve opening degree stepwise is used as the cathode pressure control valve 27. An orifice, a turbine nozzle, or the like may alternatively be used as the cathode pressure control valve 27. The opening degree of the cathode pressure control valve 27 is controlled by the controller 200. The greater the opening degree of the cathode pressure control valve 27, the more the cathode pressure control valve 27 is opened, while, the smaller the opening degree of the cathode pressure control valve 27, the more the cathode pressure control valve 27 is closed.

The anode gas supply/discharge device 3 constitutes an anode gas supply device that supplies an anode gas to the fuel cell stack 1, and an anode circulation system.

The anode gas supply/discharge device 3 of this embodiment supplies hydrogen as an anode gas to the anode electrode side of the fuel cell stack 1 and reintroduces a gas discharged from the anode electrode side of the fuel cell stack 1 into the anode electrode of the fuel cell stack 1 for circulation.

Further, the anode gas supply/discharge device 3 dilutes impurities in a gas discharged from the anode electrode side of the fuel cell stack 1 with a cathode discharged gas for discharge to the atmosphere. Hereinafter, a gas discharged from the anode electrode side of the fuel cell stack 1 will be referred to as an "anode discharged gas".

The anode gas supply/discharge device 3 includes a high pressure tank 31, an anode gas supply passage 32, an anode pressure control valve 33, an ejector 34, an anode gas circulation passage 35, an anode circulation pump 36, an anode pressure sensor 37, an impurity discharge passage 38, and a purge valve 39. The anode circulation system of this embodiment is formed by the fuel cell stack 1, the ejector 34, the anode gas circulation passage 35, and the anode circulation pump 36.

The high pressure tank 31 stores hydrogen being fuel to be supplied to the fuel cell stack 1, while maintaining it at high pressure.

The anode gas supply passage 32 is a passage for supplying hydrogen stored in the high pressure tank 31 to the fuel cell stack 1 as an anode gas. The anode gas supply passage 32 has one end connected to the high pressure tank 31 and the other end connected to an anode gas inlet hole of the fuel cell stack 1.

The anode pressure control valve 33 is provided in the anode gas supply passage 32 upstream of the ejector 34. The anode pressure control valve 33 adjusts the pressure in the anode gas supply passage 32, i.e. the pressure of an anode gas to be supplied to the ejector 34. For example, a solenoid valve capable of changing the valve opening degree step-wise is used as the anode pressure control valve 33. The opening degree of the anode pressure control valve 33 is open/close controlled by the controller 200.

The ejector 34 is provided in the anode gas supply passage 32 between the anode pressure control valve 33 and the fuel cell stack 1. The ejector 34 is a mechanical pump that merges an anode discharged gas, discharged from the fuel cell stack 1, with an anode gas supplied through the anode pressure control valve 33, thereby supplying the merged gas to the fuel cell stack 1.

The ejector 34 of this embodiment is an ejector with a constant nozzle diameter. In the ejector 34, an anode gas supplied from the high pressure tank 31 is ejected from a nozzle disposed at an inlet port toward a diffuser, thereby producing a negative pressure in the diffuser. Then, using this negative pressure, an anode discharged gas is sucked from a suction port into the diffuser, so that the sucked anode discharged gas and an anode gas newly ejected from the nozzle are mixed together and discharged from an outlet port toward the fuel cell stack 1.

In this way, by increasing the flow velocity of an anode gas supplied through the anode pressure control valve 33, the ejector 34 sucks an anode discharged gas from the anode gas circulation passage 35 and circulates the anode discharged gas to the anode electrode of the fuel cell stack 1.

The anode gas circulation passage 35 is a passage for introducing an anode discharged gas from the fuel cell stack 1 into the anode gas supply passage 32 for circulation into the fuel cell stack 1. The anode gas circulation passage 35 has one end connected to an anode gas outlet hole of the fuel cell stack 1 and the other end connected to the suction port (circulation port) of the ejector 34.

The anode circulation pump 36 is provided in the anode gas circulation passage 35. The anode circulation pump 36 includes an actuator for delivering an anode discharged gas to the fuel cell stack 1 through the ejector 34. In order to achieve the circulation flow rate of an anode discharged gas circulating in the anode electrode of the fuel cell stack 1, the anode circulation pump 36 increases the pressure in the anode gas circulation passage 35.

The anode circulation pump 36 of this embodiment is realized by an HRB (Hydrogen recirculation blower). Hereinafter, the anode circulation pump 36 will also be referred to as an "HRB". The number of revolutions (rotational speed) of the anode circulation pump 36 is controlled by the controller 200. The anode circulation pump 36 is not limited to the HRB as long as it can increase the pressure of an anode discharged gas for delivery to the ejector 34, and may alternatively be a compressor or a pump.

The anode pressure sensor 37 is provided in the anode gas supply passage 32 between the ejector 34 and the fuel cell stack 1. The anode pressure sensor 37 detects a pressure of an anode gas that is supplied from the ejector 34 to the fuel cell stack 1. Hereinafter, the pressure of an anode gas that is supplied to the fuel cell stack 1 will be referred to as an "anode pressure". The anode pressure sensor 37 outputs a signal indicative of a detected anode pressure to the controller 200.

The impurity discharge passage 38 is a passage for discharging impurities in an anode discharged gas. The impurities referred to herein are water produced by power generation in the fuel cell stack 1, a nitrogen gas transmitted from the cathode electrode to the anode electrode through the electrolyte membrane in the fuel cell stack 1, and so on.

The impurity discharge passage 38 has one end connected to the anode gas circulation passage 35 and the other end connected to the cathode gas discharge passage 26 downstream of the cathode pressure control valve 27. Consequently, hydrogen discharged with the impurities from the impurity discharge passage 38 is diluted with a cathode discharged gas flowing in the cathode gas discharge passage 26.

Although not illustrated herein, a gas-liquid separator for separation of produced water and gases such as nitrogen gas in an anode discharged gas is provided at a connecting portion between the anode gas circulation passage 35 and the impurity discharge passage 38.

The purge valve 39 is provided in the impurity discharge passage 38. The purge valve 39 purges impurities contained in an anode discharged gas to the outside. The purge valve 39 is open/close controlled by the controller 200. For example, the purge valve 39 repeats opening and closing at a constant period by duty control.

Hydrogen is purged with impurities through the purge valve 39, and a purge gas containing them is discharged into the cathode gas discharge passage 26. The flow rate of a cathode discharged gas is adjusted so that the hydrogen concentration after dilution with the cathode discharged gas becomes equal to or less than a prescribed value.

The stack cooling device 4 is a device that cools the temperature of the fuel cell stack 1. The stack cooling device 4 includes a cooling water circulation passage 41, a cooling water pump 42, a radiator 43, a bypass passage 44, a three-way valve 45, an inlet water temperature sensor 46, and an outlet water temperature sensor 47.

The cooling water circulation passage 41 is a passage for circulating cooling water through the fuel cell stack 1. The cooling water circulation passage 41 has one end connected to a cooling water inlet hole of the fuel cell stack 1 and the other end connected to a cooling water outlet hole of the fuel cell stack 1.

The cooling water pump 42 is provided in the cooling water circulation passage 41. The cooling water pump 42 supplies cooling water to the fuel cell stack 1 through the radiator 43. The rotational speed of the cooling water pump 42 is controlled by the controller 200.

The radiator 43 is provided in the cooling water circulation passage 41 downstream of the cooling water pump 42. Using a fan, the radiator 43 cools cooling water warmed in the fuel cell stack 1.

The bypass passage 44 is a passage bypassing the radiator 43 and is a passage for returning cooling water discharged from the fuel cell stack 1 to the fuel cell stack 1 for circulation. The bypass passage 44 has one end connected to the cooling water circulation passage 41 between the cooling water pump 42 and the radiator 43 and the other end connected to the three-way valve 45.

The three-way valve 45 adjusts the temperature of cooling water that is supplied to the fuel cell stack 1. The three-way valve 45 is realized by, for example, a thermostat. The three-way valve 45 is provided in the cooling water circulation passage 41 between the radiator 43 and the cooling water inlet hole of the fuel cell stack 1 at a portion where the bypass passage 44 joins the cooling water circulation passage 41.

The inlet water temperature sensor 46 and the outlet water temperature sensor 47 each detect a temperature of cooling water. The temperatures of cooling water detected by the inlet water temperature sensor 46 and the outlet water temperature sensor 47 are used as the temperature of the fuel cell stack 1. Hereinafter, the temperature of the fuel cell stack 1 will also be referred to as an "FC temperature".

The inlet water temperature sensor 46 is provided in the cooling water circulation passage 41 near the cooling water inlet hole of the fuel cell stack 1. The inlet water temperature sensor 46 detects a temperature of cooling water flowing into the cooling water inlet hole of the fuel cell stack 1. Hereinafter, the temperature of cooling water flowing into the fuel cell stack 1 will be referred to as an "FC inlet water temperature". The inlet water temperature sensor 46 outputs a signal indicative of a detected FC inlet water temperature to the controller 200.

The outlet water temperature sensor 47 is provided in the cooling water circulation passage 41 near the cooling water outlet hole of the fuel cell stack 1. The outlet water temperature sensor 47 detects a temperature of cooling water discharged from the fuel cell stack 1. Hereinafter, the temperature of cooling water discharged from the fuel cell stack 1 will be referred to as an "FC outlet water temperature". The outlet water temperature sensor 47 outputs a signal indicative of a detected FC outlet water temperature to the controller 200.

The load device 5 is a device that is connected to the fuel cell stack 1 and driven by being supplied with electric power from the fuel cell stack 1. The load device 5 may include, for example, an electric motor that drives a vehicle, a control unit that controls the electric motor, FC accessories being auxiliary devices that are necessary for power generation of the fuel cell stack 1, and so on. As the FC accessories, there can be cited, for example, the compressor 22, the anode circulation pump 36, the cooling water pump 42, and so on.

The control unit of the load device 5 outputs a required load to the fuel cell stack 1 to the controller 200. The required load referred to herein is a parameter that is correlated with a power generation amount of the fuel cell stack 1 and may be, for example, a required electric power that is necessary for driving the load device 5, a target current or a target voltage of the fuel cell stack 1 that is necessary for supplying the required electric power to the load device 5, or the like. The greater the required electric power of the load device 5, the higher the required load to the fuel cell stack 1. In the fuel cell system 100 mounted on the vehicle, the greater the depression amount of an accelerator pedal, the greater the required load from the load device 5.

A current sensor 51 and a voltage sensor 52 are disposed between the load device 5 and the fuel cell stack 1. The current sensor 51 is connected to a power line between a positive electrode terminal 1p of the fuel cell stack 1 and a positive electrode terminal of the load device 5. The current sensor 51 detects a current that is output from the fuel cell stack 1 to the load device 5. The voltage sensor 52 is connected between the positive electrode terminal 1p and a negative electrode terminal 1n of the fuel cell stack 1. The voltage sensor 52 detects an inter-terminal voltage being a voltage between the positive electrode terminal 1p and the negative electrode terminal 1n.

The controller 200 is a control device formed by a microcomputer including a central processing unit (CPU), a read-only memory (ROM), a random access memory (RAM), and an input/output interface (I/O interface). The controller 200 may alternatively be formed by a plurality of microcomputers.

Output signals of the flow rate sensor 23, the cathode pressure sensor 25, the anode pressure sensor 37, the inlet water temperature sensor 46, and the outlet water temperature sensor 47 and a required load from the load device 5 are input into the controller 200. In addition, an output signal of an atmospheric pressure sensor 201 that detects an atmospheric pressure is input into the controller 200. These input signals are used as parameters relating to the operating state of the fuel cell system 100.

The controller 200 controls the power generation amount of the fuel cell stack 1 according to these input signals. In this embodiment, the controller 200 controls the opening degree of the anode pressure control valve 33 and the manipulated variable of the anode circulation pump 36 according to the magnitude of a required load to the fuel cell stack 1. At the same time, the controller 200 controls the manipulated variable of the compressor 22 and the opening degree of the cathode pressure control valve 27 according to the operating state of the fuel cell system 100.

For example, based on the required load to the fuel cell stack 1, the controller 200 calculates a target flow rate and a target pressure of a cathode gas and a target circulation flow rate and a target pressure of an anode gas to be supplied to the fuel cell stack 1.

The controller 200 controls the motor torque of the compressor 22 and the opening degree of the cathode pressure control valve 27 based on the target flow rate and the target pressure of the cathode gas. At the same time, the controller 200 controls the rotational speed of the anode circulation pump 36 and the opening degree of the anode pressure control valve 33 based on the target circulation flow rate and the target pressure of the anode gas.

For example, the controller 200 controls the opening degree of the cathode pressure control valve 27 and the opening degree of the anode pressure control valve 33 so that the differential pressure between the cathode pressure and the anode pressure, i.e. the inter-electrode differential pressure, in the fuel cell stack 1 becomes as small as possible.

Figure 2:
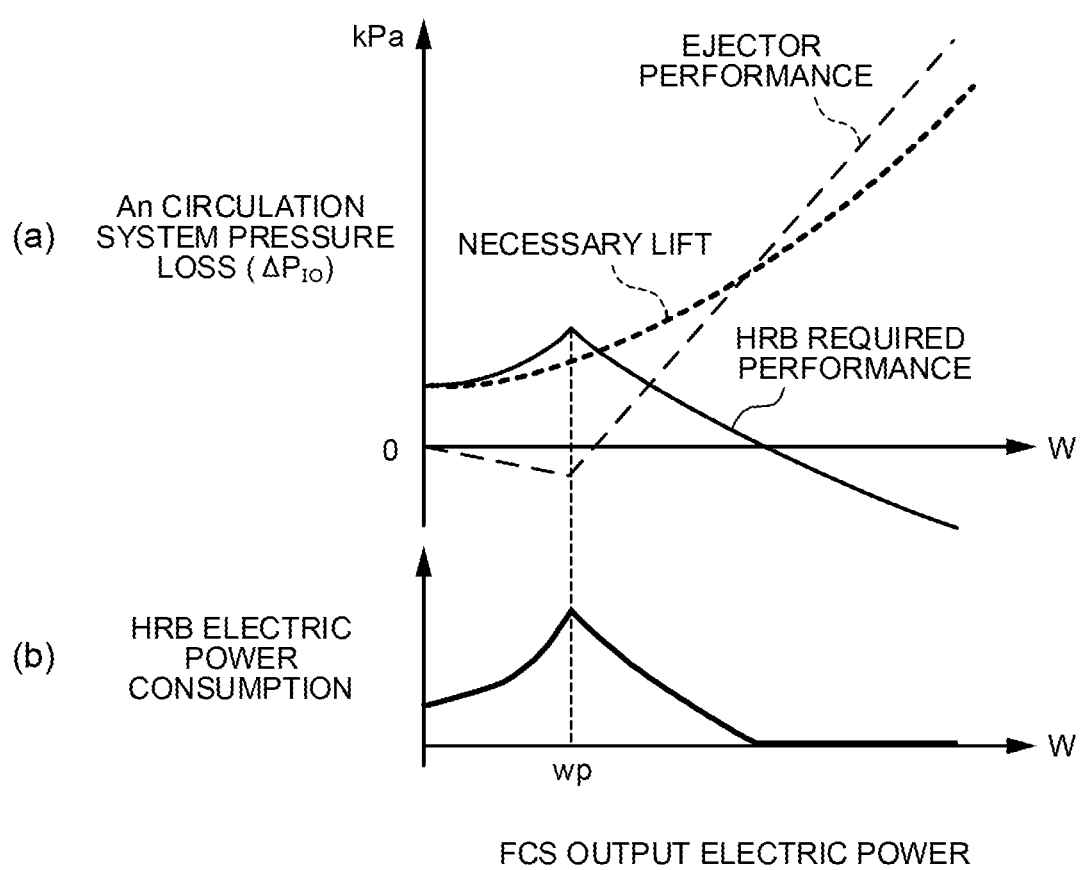
FIG. 2 is a diagram showing the relationship between the performance of an ejector and the necessary lift of an anode circulation system in this embodiment.

FIG. 2 is an explanatory diagram about the performance of the ejector 34 in this embodiment. FIG. 2(a) conceptually shows the relationship between the performance of the ejector 34 and the necessary lift (lifting range) of the anode circulation system.

In FIG. 2(a), the abscissa axis represents the output electric power W from the fuel cell system 100 to the load device 5, and the ordinate axis represents the pressure loss of the anode circulation system. The pressure loss of the anode circulation system referred to herein means a pressure loss ΔPio being a differential pressure between an anode gas inlet pressure and an anode gas outlet pressure in the fuel cell stack 1.

In FIG. 2(a), the relationship between the output electric power W of the fuel cell system 100 and the lift of the ejector 34 is indicated by a broken line, and the change in the necessary lift of the anode circulation system that is necessary for achieving the output electric power W of the fuel cell system 100 is indicated by a dotted line.

The lift of the ejector 34 means an increase amount of the pressure in the anode gas circulation passage 35, i.e. a pressure increase amount of an anode discharged gas, by the ejector 34. The necessary lift means a pressure increase amount of an anode discharged gas that is necessary for achieving an anode gas circulation flow rate to be supplied to the fuel cell stack 1.

As indicated by the broken line in FIG. 2(a), in a range where the output electric power of the fuel cell system 100 is high, i.e. in a high load range of the fuel cell stack 1, since the pressure of an anode gas that is supplied to the ejector 34 becomes higher as the required load increases, the lift of the ejector 34 largely increases. In this way, the ejector 34 of this embodiment is designed so that the lift of the ejector 34 increases in the high load range of the fuel cell stack 1.

On the other hand, in a range where the output electric power of the fuel cell system 100 is low, i.e. in a low load range of the fuel cell stack 1, since the pressure of an anode gas that is supplied to the ejector 34 becomes low, the lift of the ejector 34 becomes minus so that the pressure of an anode discharged gas is lowered due to the structural characteristics of the ejector 34. Taking this into account, as indicated by a solid line in FIG. 2(*a*), it is a common approach to drive the anode circulation pump 36 in the low-medium load range to increase the pressure of an anode discharged gas, thereby achieving the necessary lift.

FIG. 2(*b*) is a conceptual diagram showing the electric power consumption of the anode circulation pump 36 when the shortage of the lift of the ejector 34 relative to the necessary lift is compensated only by the anode circulation pump 36.

As shown in FIG. 2(*a*), as the output electric power of the fuel cell system 100 increases from zero, the lift of the ejector 34 increases in the minus direction due to pressure loss of the ejector 34 itself. Therefore, as the output electric power of the fuel cell system 100 increases from zero, the electric power consumption of the anode circulation pump 36 increases.

Then, at an output point $w_p$ of the fuel cell system 100, since the lift of the ejector 34 becomes the maximum in the minus direction, the electric power consumption of the anode circulation pump 36 becomes the maximum. The output point $w_p$ is located in a range of approximately 20% to 30% of the output range of the fuel cell system 100, and this range corresponds to the average output in the high-speed running state of the vehicle.

As the output electric power of the fuel cell system 100 becomes greater than the output point $w_p$, the pressure of an anode gas that is supplied to the ejector 34 increases so that the lift of the ejector 34 increases as shown in FIG. 2(*a*), and therefore, the electric power consumption of the anode circulation pump 36 decreases correspondingly. Consequently, the electric power consumption of the anode circulation pump 36 becomes zero or constant in the high load range.

In this way, the required power of the anode circulation pump 36 becomes the maximum at the output point $w_p$ where the lift of the ejector 34 becomes the maximum in the minus direction. That is, in the low load range of the fuel cell stack 1, since the pressure of an anode discharged gas is lowered due to the characteristics of the ejector 34, the electric power consumption of the anode circulation pump 36 increases correspondingly.

As a result, when the load of the fuel cell stack 1 is in the low load range, although the anode circulation pump 36 is driven to increase the pressure of an anode discharged gas, the pressure of the anode discharged gas is lowered due to pressure loss of the ejector 34. That is, in the low load range, part of the power of the anode circulation pump 36 is wasted.

Further, if the anode circulation pump 36 is driven to achieve the necessary lift, the flow velocity of the anode gas to the fuel cell stack 1 becomes high so that the pressure loss of the anode circulation system including the fuel cell stack 1 becomes large.

In contrast, if the pressure of an anode gas that is supplied to the ejector 34 is made high, since the density of the anode gas becomes high, the flow velocity of the anode gas to the fuel cell stack 1 can be reduced while achieving the hydrogen supply amount to the anode electrode. Since the pressure loss of the anode circulation system is proportional to the density of the anode gas and to the square of the flow velocity of the anode gas, when the flow velocity of the anode gas is reduced, the pressure loss of the anode circulation system is reduced so that the necessary lift of the anode circulation system is also reduced. Therefore, by increasing the pressure of the anode gas that is supplied to the ejector 34, it is possible to reduce the power of the anode circulation pump 36.

Accordingly, in the low load range where the pressure of an anode discharged gas is lowered by the ejector 34, the controller 200 of this embodiment increases the pressure of an anode gas for reducing the necessary lift of the anode circulation system.

Figure 3:
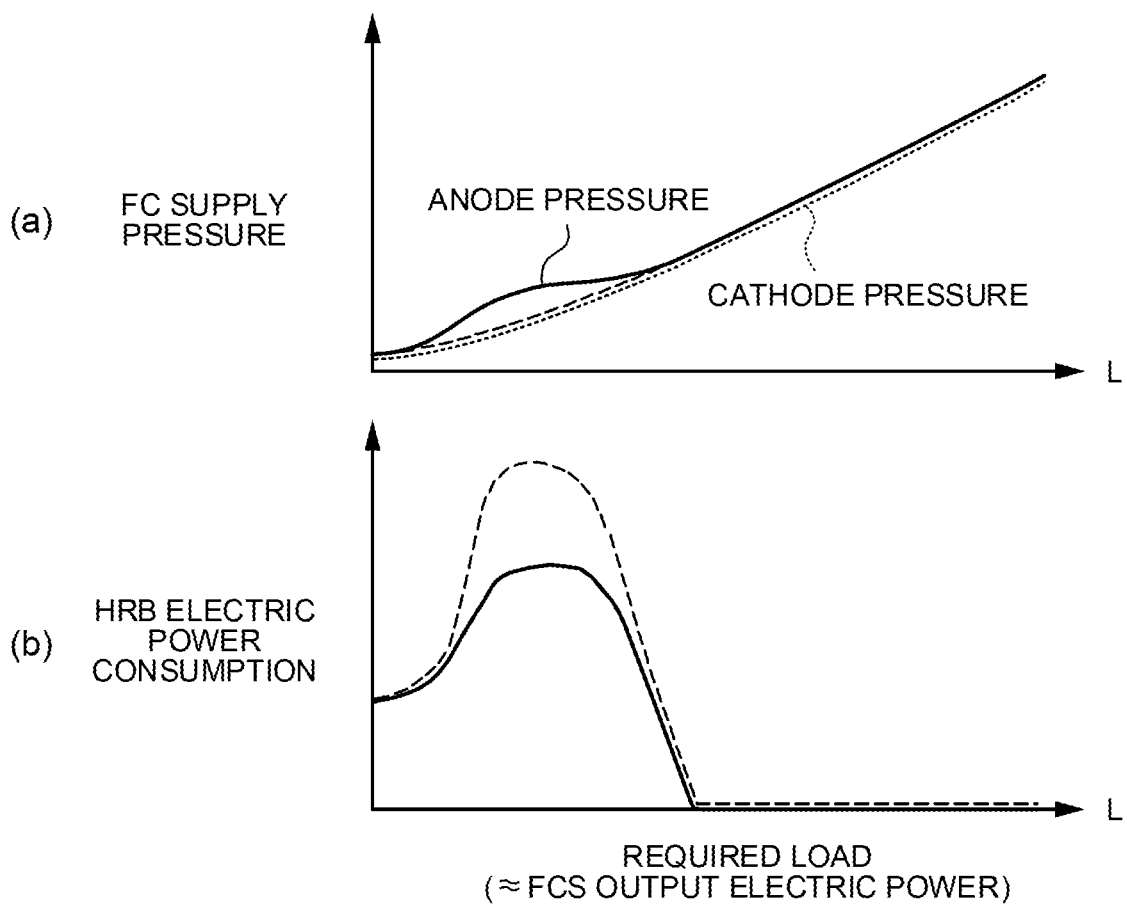
FIG. 3 is a diagram for explaining one example of a method for controlling the anode gas pressure of a fuel cell in this embodiment.

FIG. 3 is a diagram showing one example of a method for controlling the anode gas pressure in this embodiment. FIG. 3(*a*) shows one example of the relationship between the required load to the fuel cell stack 1 and the anode pressure and the cathode pressure in the fuel cell stack 1.

In FIG. 3(*a*), the change in the anode pressure and the change in the cathode pressure when pressure control in this embodiment is performed are respectively indicated by a solid line and a dotted line. Further, in FIG. 3(*a*), a comparative example is indicated by a broken line.

As indicated by the dotted line in FIG. 3(*a*), in order to achieve an oxygen partial pressure that is necessary for power generation of the fuel cell stack 1, the controller 200 of this embodiment increases the cathode pressure of the fuel cell stack 1 as the required load to the fuel cell stack 1 increases.

At the same time, the controller 200 makes the inter-electrode differential pressure between the cathode pressure and the anode pressure greater when the required load is in the low load range than when the required load is in the high load range. That is, when the load of the fuel cell stack 1 is low, the controller 200 increases the pressure of an anode gas compared to the pressure of a cathode gas in the fuel cell stack 1.

In this embodiment, the controller 200 controls the opening degree of the anode pressure control valve 33 so that the anode pressure becomes greater as the required load becomes higher and further that the characteristics of the anode pressure with respect to the required load has a convex portion in the low load range.

FIG. 3(*b*) conceptually shows the relationship between the required load to the fuel cell stack 1 and the electric power consumption of the anode circulation pump 36 in this embodiment.

In FIG. 3(*b*), the change in the electric power consumption of the anode circulation pump 36 when the pressure control in this embodiment is performed is indicated by a solid line, and the comparative example representing the change in the electric power consumption of the anode circulation pump 36 when the pressure control indicated by the broken line in FIG. 3(*a*) is performed is indicated by a broken line.

As shown in FIG. 3(*b*), since the anode gas circulation flow rate that is necessary for power generation of the fuel cell stack 1 can be reduced by increasing the anode gas pressure to the ejector 34 in the low load range, it is possible to reduce the electric power consumption of the anode circulation pump 36 correspondingly.

In the example of FIG. 3(*b*), the peak of the electric power consumption of the anode circulation pump 36 is reduced by about 30% compared to the comparative example. In this way, by increasing the anode pressure without increasing the electric power consumption of the entire system in the low load range, the peak value of the electric power consumption of the anode circulation pump 36 can be reduced so that it is possible to reduce the size of the anode circulation pump 36.

Since pressure reduction of an anode discharged gas by the ejector 34 is suppressed by increasing the anode gas pressure in the low load range, it is possible to avoid the situation in which part of the power of the anode circulation pump 36 is wasted due to the pressure reduction of the anode discharged gas by the ejector 34.

Further, when the fuel cell stack 1 is in the high load range, since an increase in the anode gas pressure is suppressed, it is possible to avoid the situation in which the supply flow rate of an anode gas to the fuel cell stack 1 becomes too high.

Even if the supply flow rate of an anode gas becomes excessive in the low load range, it is possible to consume excess anode gas when the fuel cell stack 1 is shifted to the high load range. Therefore, the anode gas is not consumed more than necessary in the fuel cell stack 1, or there is no need to throw away the excess anode gas. Consequently, it is possible to suppress degradation of fuel economy of the fuel cell system 100.

Further, since the increase in the anode gas pressure is suppressed in the high load range, the inter-electrode differential pressure between the anode pressure and the cathode pressure becomes small so that it is possible to suppress lowering of durability of the electrolyte membrane.

Since the discharge amount of hydrogen that is discharged from the purge valve 39 to the atmosphere decreases by reducing the increase amount of the anode gas pressure in the high load range, the fuel economy of the fuel cell system 100 can be improved. Further, since the permeation amount (leak amount) of hydrogen from the anode electrode to the cathode electrode decreases, the fuel economy can be further improved.

In the example of FIG. 3(*a*), the inter-electrode differential pressure is zero in an extremely low load range where the required load is from zero to a specific value, but the controller 200 may control the opening degree of the anode pressure control valve 33 so that the inter-electrode differential pressure becomes constant or the anode pressure becomes constant in this extremely low load range. Even in such a case, it is possible to reduce the electric power consumption of the anode circulation pump 36.

Figure 4:
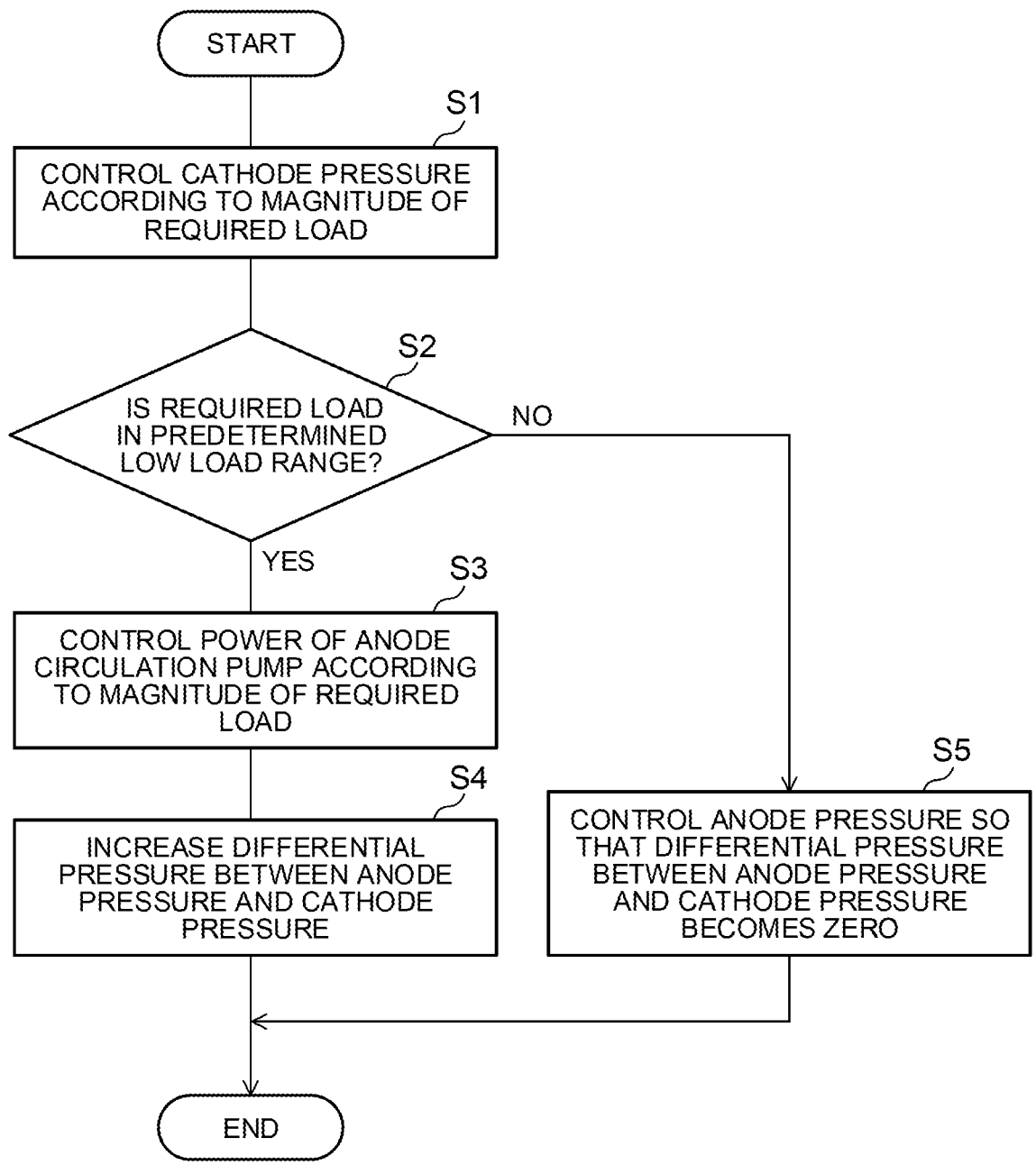
FIG. 4 is a flowchart showing a control method for the fuel cell system in this embodiment.

FIG. 4 is a flowchart showing one example of the processing sequence of a control method for the fuel cell system 100 in this embodiment.

At step S1, according to the magnitude of a required load from the load device 5, the controller 200 controls the cathode pressure being the pressure of a cathode gas that is supplied to the fuel cell stack 1. For example, the controller 200 increases the cathode pressure as the required load becomes higher.

At step S2, the controller 200 determines whether or not the required load is in a predetermined low load range. The predetermined low load range is set to a load range where the anode gas circulation flow rate by the ejector 34 cannot be achieved.

At step S3, when the required load is in the predetermined low load range, the controller 200 controls the power of the anode circulation pump 36 according to the magnitude of the required load.

At step S4, the controller 200 increases the inter-electrode differential pressure between the cathode pressure and the anode pressure in the fuel cell stack 1 by controlling the opening degree of the anode pressure control valve 33. Consequently, since the pressure of an anode gas that is supplied to the ejector 34 increases, the flow velocity of the anode gas necessary for power generation of the fuel cell stack 1 can be reduced so that it is possible to reduce the electric power consumption of the anode circulation pump 36 as shown in FIG. 3(*b*).

For example, the controller 200 increases the anode pressure within a range where a purge gas can be diluted only with the flow rate of a cathode discharged gas that is discharged from the fuel cell stack 1. Consequently, since it is not necessary to make the compressor flow rate greater than a cathode gas flow rate that is necessary for power generation of the fuel cell stack 1, it is possible to suppress an increase in the electric power consumption of the compressor 22.

At step S5, when the required load is outside the predetermined low load range, the controller 200 controls the opening degree of the anode pressure control valve 33 so that the anode pressure and the cathode pressure become equal to each other. Consequently, it is possible to suppress lowering of durability of the electrolyte membrane.

When the processing of step S4 or S5 has finished, the series of the processing sequence of the control method for the fuel cell system 100 is ended.

According to the first embodiment of the present invention, the fuel cell system 100 includes the ejector 34 that merges an anode discharged gas of the fuel cell stack 1 with an anode gas to be supplied to the fuel cell stack 1, and the anode circulation pump 36 that supplies the anode discharged gas to the ejector 34.

The control method for the fuel cell system 100 includes cathode gas control step S1 that controls the pressure of a cathode gas to be supplied to the fuel cell stack 1 according to the magnitude of a required load that is required of the fuel cell stack 1. Further, the control method includes anode gas control steps S2 to S4 that increase the differential pressure between the pressure of an anode gas to be supplied to the fuel cell stack 1 through the anode pressure control valve 33 and the pressure of the cathode gas when the required load is low compared to when the required load is high.

In this way, by increasing the pressure of the anode gas when the load of the fuel cell stack 1 is low, lowering of the pressure of an anode discharged gas in the ejector is suppressed so that the pressure increase amount of the anode discharged gas by the actuator of the anode circulation pump 36 can be reduced correspondingly. Therefore, it is possible to reduce the electric power consumption of the actuator.

On the other hand, by reducing the differential pressure between the cathode gas and the anode gas when the load of the fuel cell stack 1 is high, the leak amount of the anode gas from the anode electrode to the cathode electrode in the fuel cell stack 1 decreases so that it is possible to suppress wasteful discharge of the anode gas. That is, it is possible to suppress degradation of fuel economy of the fuel cell system 100.

Further, since the differential pressure between the cathode gas and the anode gas becomes small when the load of the fuel cell stack 1 is high, it is possible to suppress lowering of durability of the electrolyte membrane formed in the fuel cell stack 1.

According to this embodiment, at step S3, the controller 200 controls the power of the anode circulation pump 36 according to the magnitude of the required load. For example, as shown in FIG. 3(*b*), the controller 200 increases the pressure increase amount of an anode discharged gas by the anode circulation pump 36 when the required load is low compared to when the required load is high.

As shown in FIG. 3(a), the controller 200 increases the pressure of an anode gas compared to the pressure of a cathode gas to be supplied to the fuel cell stack 1 in the predetermined low load range where the power of the anode circulation pump 36 is increased. Consequently, since the maximum value of the electric power consumption of the anode circulation pump 36 is reduced, it is possible to reduce the size of the anode circulation pump 36.

As indicated by the broken line in FIG. 2(a), the predetermined low load range is set to a load range where it is not possible for the ejector 34 to suck and circulate an anode discharged gas by an anode gas pressure that is necessary for power generation of the fuel cell stack 1.

According to this embodiment, when the required load is outside the predetermined low load range, the controller 200 reduces the pressure of an anode gas so as to be equal to the pressure of a cathode gas at step S5. Consequently, since the inter-electrode differential pressure in the fuel cell stack 1 approaches zero, it is possible to suppress degradation of the electrolyte membrane in the fuel cell stack 1.

According to this embodiment, the fuel cell system 100 includes the cathode gas supply/discharge device 2 that supplies a cathode gas to the fuel cell stack 1, the anode pressure control valve 33 that adjusts the pressure of an anode gas to be supplied to the fuel cell stack 1, and the ejector 34 that merges an anode discharged gas of the fuel cell stack 1 with the anode gas to the fuel cell stack 1. Further, the fuel cell system 100 includes the actuator of the anode circulation pump 36 that supplies the anode discharged gas to the ejector 34, and the controller 200 forming a control device that controls power generation of the fuel cell stack 1 according to the load device 5 connected to the fuel cell stack 1.

The controller 200 increases the ratio of the manipulated variable of the anode pressure control valve 33 to the manipulated variable of the cathode gas pressure by the cathode gas supply/discharge device 2 when a required load required by the load device 5 is low compared to when it is high.

For example, in the low load range, the controller 200 increases the ratio of the manipulated variable of the anode pressure control valve 33 to the manipulated variable of the cathode pressure control valve 27 in the cathode gas supply/discharge device 2. Consequently, since the opening degree of the anode pressure control valve 33 becomes greater than the opening degree of the cathode pressure control valve 27 in the low load range, it is possible to increase the differential pressure between the cathode gas pressure and the anode gas pressure as shown in FIG. 3(a).

Therefore, as shown in FIG. 3(b), it is possible to suppress the electric power consumption of the anode circulation pump 36 while reducing the leak amount of an anode gas from the anode electrode to the cathode electrode in the fuel cell stack 1.

Second Embodiment

Figure 5:
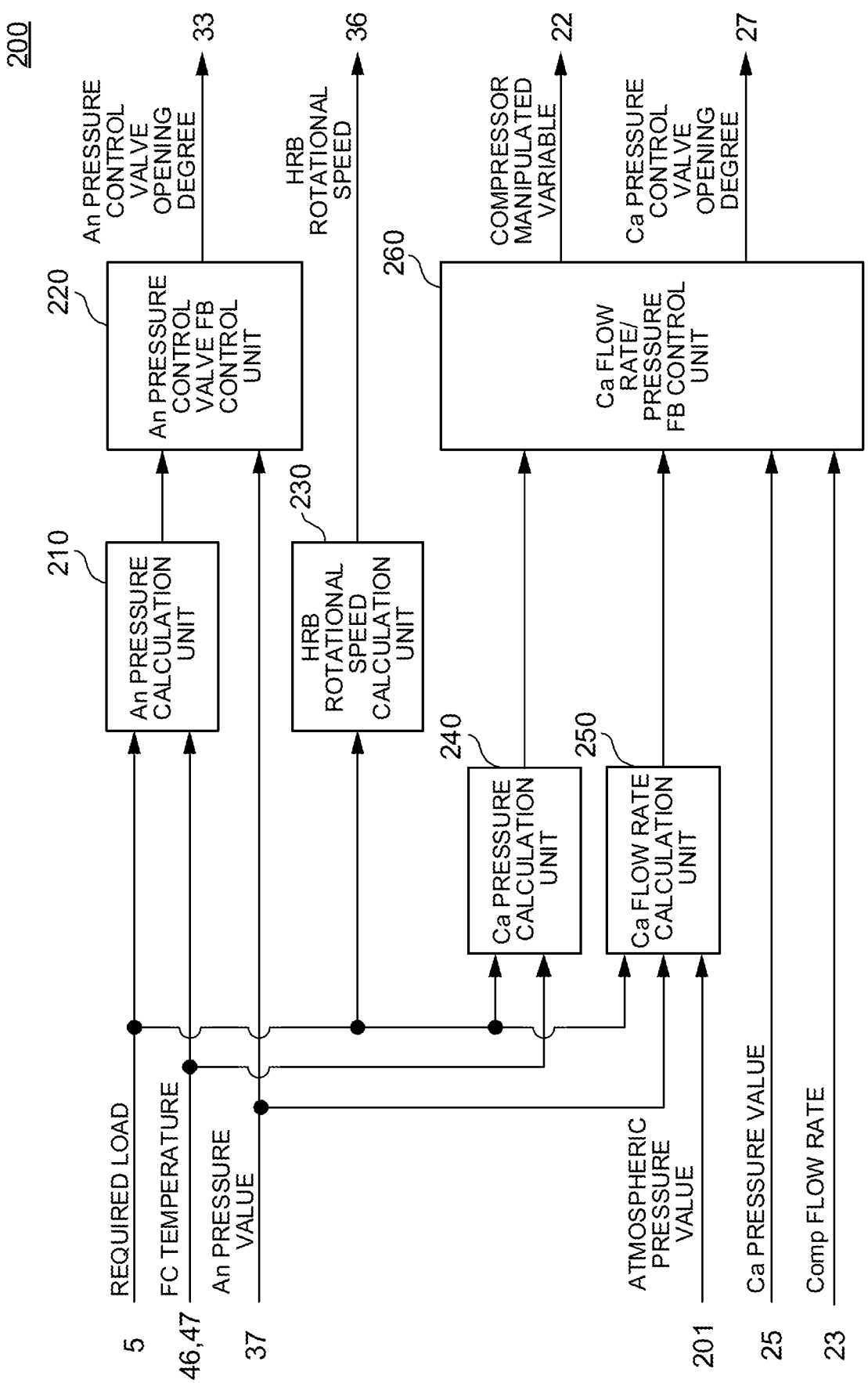
FIG. 5 is a block diagram showing a functional configuration example of a controller that controls a fuel cell system in a second embodiment of the present invention.

FIG. 5 is a block diagram showing a functional configuration of a controller 200 in a second embodiment of the present invention.

The controller 200 includes an An pressure calculation unit 210, an An pressure control valve FB control unit 220, an HRB rotational speed calculation unit 230, a Ca pressure calculation unit 240, a Ca flow rate calculation unit 250, and a Ca flow rate/pressure FR control unit 260.

The An pressure calculation unit 210 calculates a target pressure of an anode gas to be supplied to the fuel cell stack 1 based on a required load from the load device 5 and an FC temperature being the temperature of the fuel cell stack 1. Details of the An pressure calculation unit 210 will be described later with reference to FIG. 6.

The An pressure calculation unit 210 of this embodiment calculates as an FC temperature the average value of an FC inlet temperature that is output from the inlet water temperature sensor 46 and an FC outlet temperature that is output from the outlet water temperature sensor 47. Alternatively, either one of the FC inlet temperature and the FC outlet temperature may be used as an FC temperature.

Based on the target pressure of the anode gas and an anode pressure value from the anode pressure sensor 37, the An pressure control valve FB control unit 220 performs feedback control of the opening degree of the anode pressure control valve 33 so that the anode pressure value converges to the target pressure.

Based on the required load from the load device 5, the HRB rotational speed calculation unit 230 calculates a target rotational speed of the anode circulation pump 36 that is necessary for achieving a necessary lift of the anode circulation system including the ejector 34 and the anode circulation pump 36. Details of the HRB rotational speed calculation unit 230 will be described later with reference to FIG. 7.

The HRB rotational speed calculation unit 230 outputs the calculated target rotational speed to the anode circulation pump 36. Consequently, the rotational speed of the anode circulation pump 36 is controlled to the target rotational speed.

Based on the required load from the load device 5 and the FC temperature, the Ca pressure calculation unit 240 calculates a target pressure of a cathode gas to be supplied to the fuel cell stack 1. Details of the Ca pressure calculation unit 240 will be described later with reference to FIG. 8.

Based on the required load from the load device 5, the anode pressure value from the anode pressure sensor 37, and an atmospheric pressure value from the atmospheric pressure sensor 201, the Ca flow rate calculation unit 250 calculates a target flow rate of the cathode gas to be supplied to the fuel cell stack 1. Details of the Ca flow rate calculation unit 250 will be described later with reference to FIG. 9.

Based on the target pressure and the target flow rate of the cathode gas, a cathode pressure value from the cathode pressure sensor 25, and a compressor flow rate from the flow rate sensor 23, the Ca flow rate/pressure FB control unit 260 controls the manipulated variable of the compressor 22 and the opening degree of the cathode pressure control valve 27. The manipulated variable of the compressor 22 is, for example, the amount of manipulating the torque of a motor provided in the compressor 22.

For example, the Ca flow rate/pressure FB control unit 260 performs feedback control of the opening degree of the cathode pressure control valve 27 so that the cathode pressure value converges to the target pressure. At the same time, the Ca flow rate/pressure FB control unit 260 performs feedback control of the manipulated variable of the compressor 22 so that the compressor flow rate converges to the target flow rate. Alternatively, the Ca flow rate/pressure FB control unit 260 may perform feedback control of the manipulated variable of the compressor 22 in addition to feedback control of the opening degree of the cathode pressure control valve 27 so that the cathode pressure value converges to the target pressure.

Figure 6:
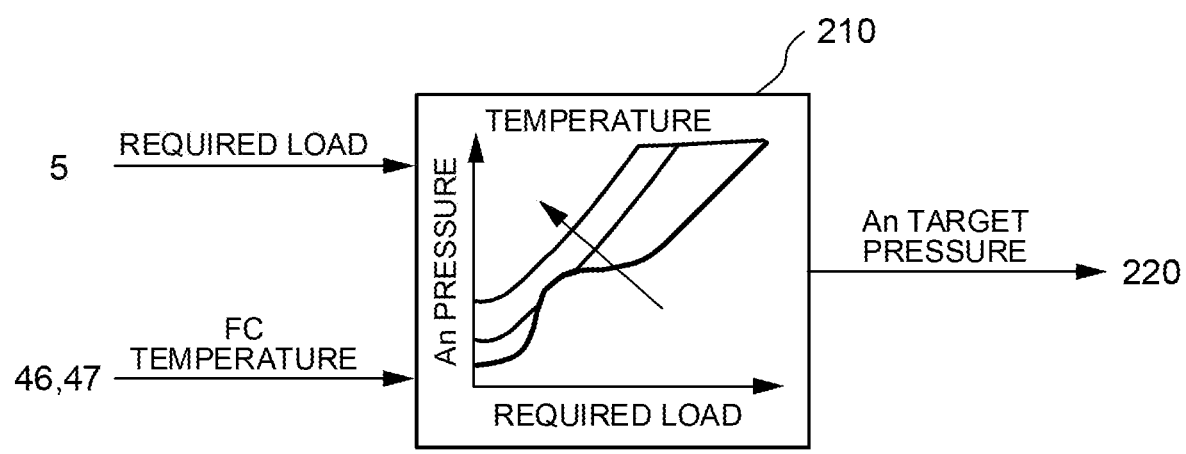
FIG. 6 is a block diagram showing a functional configuration that calculates a target pressure of an anode gas to be supplied to a fuel cell.

FIG. 6 is a block diagram showing a detailed configuration of the An pressure calculation unit 210 in this embodiment.

Based on the required load of the load device 5, the An pressure calculation unit 210 calculates a target pressure indicative of an anode gas pressure that is necessary for power generation of the fuel cell stack 1. Then, the An pressure calculation unit 210 corrects the anode gas target pressure according to the FC temperature determined based on the detection values of the inlet water temperature sensor 46 and the outlet water temperature sensor 47.

As shown in FIG. 6, an An pressure control map showing, per FC temperature, the relationship between a required load and an anode pressure that is necessary for achieving the required load is stored in the An pressure calculation unit 210. The An pressure calculation unit 210 acquires a required load from the load device 5 and calculates an FC temperature, and then refers to the An pressure control map corresponding to the FC temperature, thereby calculating an anode pressure associated with the acquired required load as an anode gas target pressure.

In this embodiment, the An pressure control map is set such that the anode pressure increases as the required load increases and that the characteristics of the anode pressure has a convex portion in the low load range.

In the An pressure control map, basically, in order to suppress lowering of durability of the electrolyte membrane, the anode gas target pressure is set so that the inter-electrode differential pressure between the cathode pressure and the anode pressure becomes small. Normally, for the same required load, the anode gas target pressure necessary for power generation of the fuel cell stack 1 becomes smaller than the cathode gas target pressure necessary for such power generation. Therefore, the anode gas target pressure is set equal to the cathode gas target pressure.

In the low load range, since the pressure increase amount of an anode discharged gas by the ejector 34 becomes minus as indicated by the broken line in FIG. 2(*a*), the anode gas target pressure is set to a value higher than the cathode gas target pressure to thereby increase the pressure of an anode gas that is supplied to the ejector 34. Consequently, since the lift of the ejector 34 increases, it is possible to reduce the power of the anode circulation pump 36 correspondingly.

As shown in FIG. 2(*a*), the load range where the characteristics of the anode pressure with respect to the required load has the convex portion is a range where the power of the anode circulation pump 36 increases, and is a range where the lift of the ejector 34 becomes insufficient compared to the necessary lift. For example, the convex portion of the anode pressure characteristics is set to include a load range from 20% to 30% with respect to the required load upper limit value.

In the An pressure control map, the anode pressure increases as the FC temperature becomes higher. The reason for this is that since the vapor pressure in the fuel cell stack 1 increases as the FC temperature becomes higher, it is accordingly necessary to achieve a hydrogen partial pressure that is necessary for power generation of the fuel cell stack 1.

In the low load range, the convex portion in the anode pressure characteristics becomes smaller as the FC temperature becomes higher. That is, the difference between the cathode gas target pressure and the anode gas target pressure is reduced as the FC temperature becomes higher. Consequently, it can be suppressed that the supply amount of an anode gas to the fuel cell stack 1 becomes excessive by unnecessarily increasing the anode gas pressure when the FC temperature is high.

In this way, the An pressure calculation unit 210 increases the difference between the cathode gas target pressure and the anode gas target pressure when the required load to the fuel cell stack 1 is low compared to when it is high.

In the low load range, the An pressure calculation unit 210 reduces the difference between the cathode gas target pressure and the anode gas target pressure as the temperature of the fuel cell stack 1 becomes higher. When the required load is outside the low load range, the An pressure calculation unit 210 calculates the anode gas target pressure to be equal to the cathode gas target pressure.

Figure 7:
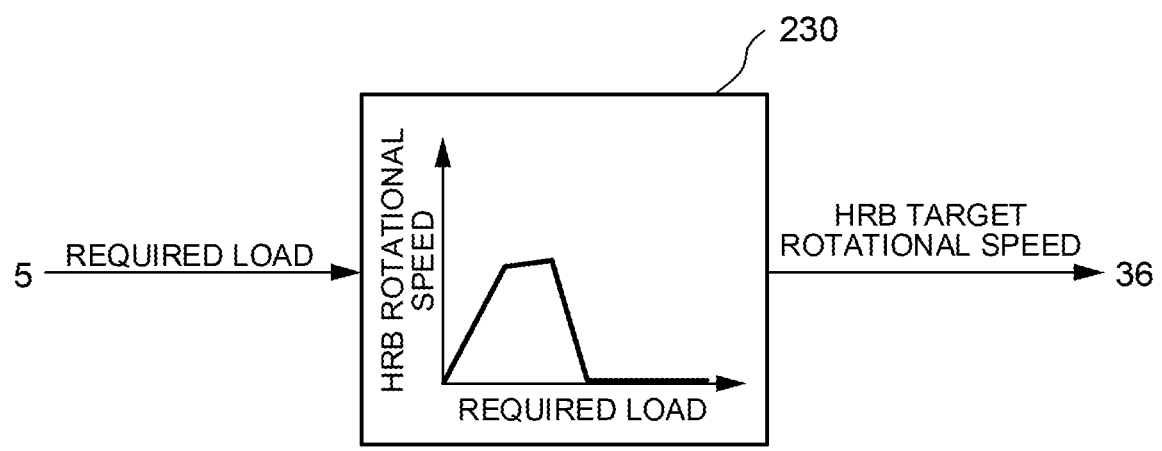
FIG. 7 is a block diagram showing a functional configuration that calculates a target power of an anode circulation pump.

FIG. 7 is a block diagram showing a detailed configuration of the HRB rotational speed calculation unit 230 in this embodiment.

Based on the required load of the load device 5, the HRB rotational speed calculation unit 230 calculates a target rotational speed indicative of a rotational speed of the anode circulation pump 36 that is necessary for power generation of the fuel cell stack 1.

As shown in FIG. 7, an HRB control map showing the relationship between a required load and an HRB rotational speed that is necessary for achieving the required load is stored in the HRB rotational speed calculation unit 230. The HRB rotational speed calculation unit 230 acquires a required load from the load device 5 and then refers to the HRB control map, thereby calculating an HRB rotational speed associated with the required load as an HRB target rotational speed.

In this embodiment, the HRB control map is set such that the characteristics of the HRB rotational speed has a trapezoidal shape in the low load range.

In the HRB control map, the HRB rotational speed increases in the low load range where the lift of the ejector 34 is below the necessary lift as shown in FIG. 2(*a*). In the low load range, the HRB rotational speed increases as the required load increases from zero, and then the HRB rotational speed becomes approximately constant in a load range corresponding to the convex portion in the An pressure control map of FIG. 6. When the required load becomes greater than this load range, the HRB rotational speed decreases rapidly.

By setting the convex portion in the An pressure control map of FIG. 6, the peak of the HRB rotational speed is suppressed so that it is possible to reduce the electric power consumption of the anode circulation pump 36 as shown in FIG. 3(*b*). Therefore, it is possible to reduce the size of the anode circulation pump 36 without increasing the electric power consumption of the fuel cell system 100.

In this way, the HRB rotational speed calculation unit 230 increases the rotational speed of the anode circulation pump 36 to increase the pressure increase amount of an anode discharged gas when the required load is low compared to when the required load is high.

Figure 8:
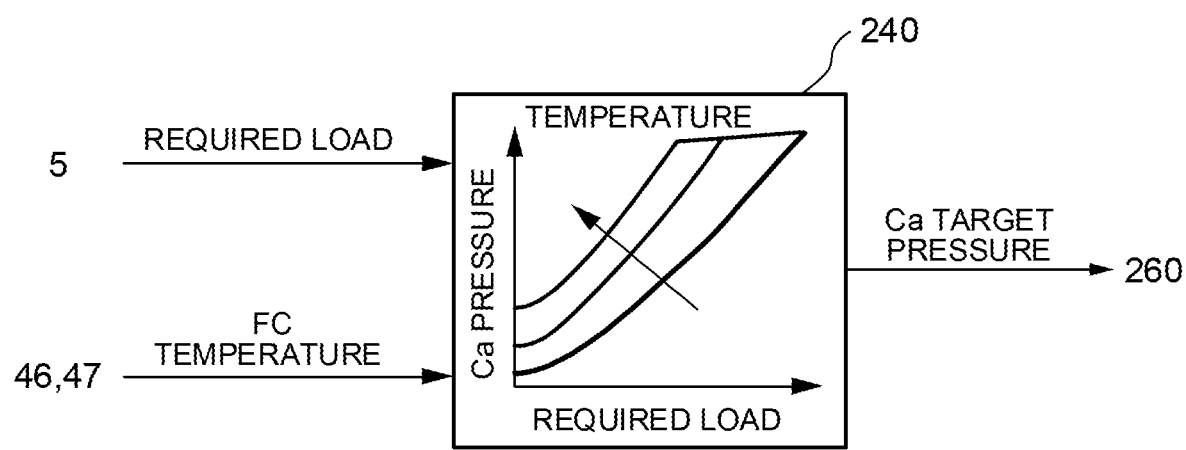
FIG. 8 is a block diagram showing a functional configuration that calculates a target pressure of a cathode gas to be supplied to the fuel cell.

FIG. 8 is a block diagram showing a detailed configuration of the Ca pressure calculation unit 240 this embodiment.

Based on the required load of the load device 5, the Ca pressure calculation unit 240 calculates a target pressure indicative of a cathode gas pressure that is necessary for power generation of the fuel cell stack 1. Then, the Ca pressure calculation unit 240 corrects the cathode gas target pressure according to the FC temperature determined based on the detection values of the inlet water temperature sensor 46 and the outlet water temperature sensor 47.

As shown in FIG. 8, a Ca pressure control map showing, per FC temperature, the relationship between a required load and a cathode pressure that is necessary for achieving the required load is stored in the Ca pressure calculation unit 240. The Ca pressure calculation unit 240 acquires a required load from the load device 5 and calculates an FC temperature, and then refers to the Ca pressure control map corresponding to the FC temperature, thereby calculating a cathode pressure associated with the acquired required load as a cathode gas target pressure.

The Ca pressure control map is set such that the cathode pressure increases as the required load increases. The reason for this is that as the required load increases, the oxygen partial pressure at the cathode electrode that is necessary for power generation of the fuel cell stack 1 increases.

The Ca pressure control map is set such that the cathode pressure increases as the FC temperature becomes higher. The reason for this is that since the vapor pressure in the fuel cell stack 1 increases as the FC temperature becomes higher, it is accordingly necessary to achieve an oxygen partial pressure that is necessary for power generation of the fuel cell stack 1.

In this way, the Ca pressure calculation unit 240 increases the target pressure of a cathode gas to be supplied to the fuel cell stack 1 as the required load to the fuel cell stack 1 increases. Then, the Ca pressure calculation unit 240 corrects the cathode gas target pressure so that the cathode gas pressure increases as the temperature of the fuel cell stack 1 becomes higher. The Ca pressure calculation unit 240 outputs the cathode gas target pressure to the Ca flow rate/pressure FB control unit 260.

Figure 9:
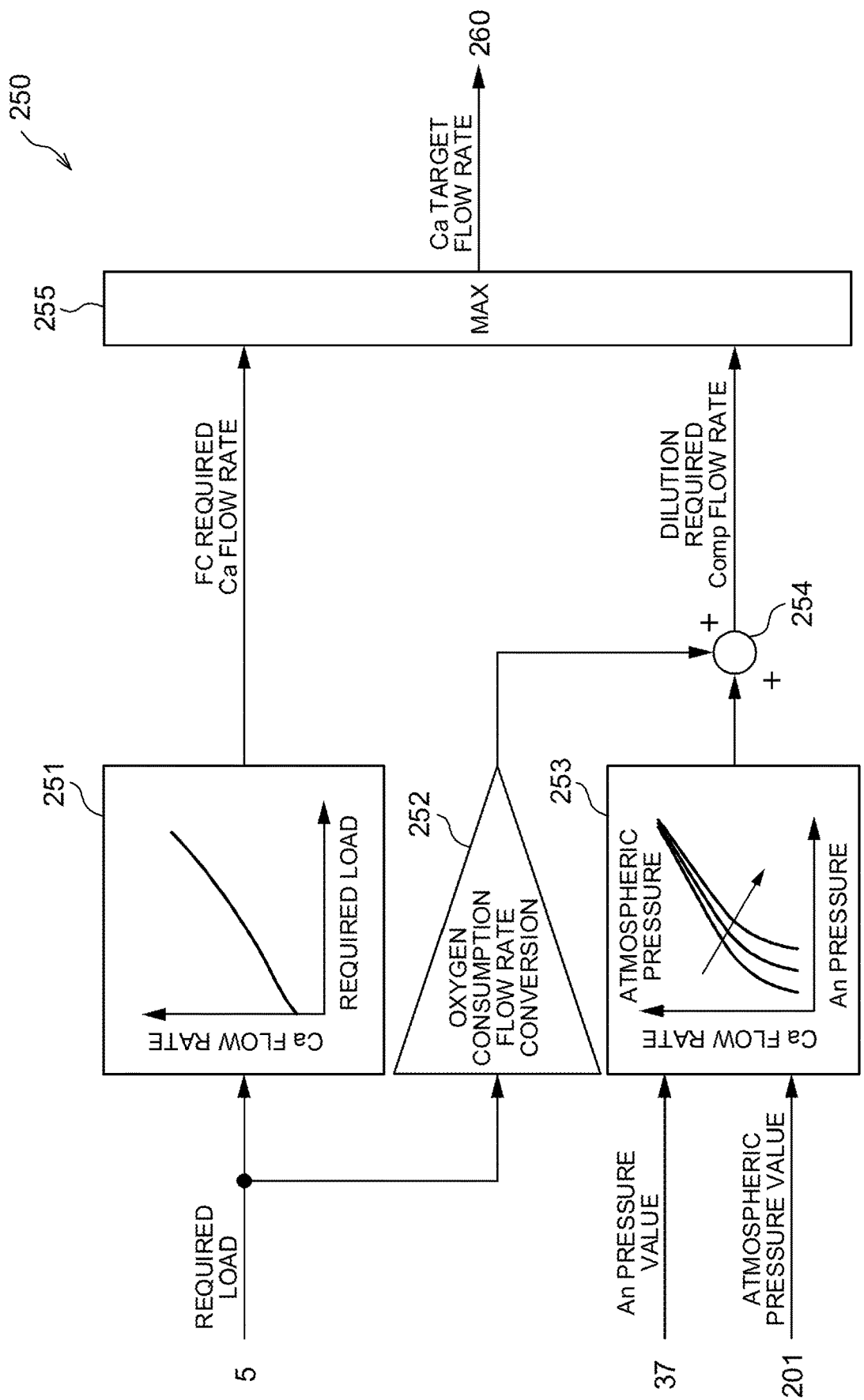
FIG. 9 is a block diagram showing a functional configuration that calculates a target flow rate of the cathode gas.

FIG. 9 is a block diagram showing a detailed configuration of the Ca flow rate calculation unit 250 in this embodiment.

The Ca flow rate calculation unit 250 includes a power generation flow rate calculation unit 251, an oxygen consumption amount calculation unit 252, a Ca discharged gas flow rate calculation unit 253, a dilution required flow rate calculation unit 254, and a target flow rate setting unit 255.

Based on the required load from the load device 5, the power generation flow rate calculation unit 251 calculates a power generation required cathode flow rate indicative of a cathode gas flow rate that is necessary for power generation of the fuel cell stack 1.

As shown in FIG. 9, a Ca flow rate control map showing the relationship between a required load to the fuel cell stack 1 and a power generation required cathode flow rate is stored in the power generation flow rate calculation unit 251. The power generation flow rate calculation unit 251 acquires a required load from the load device 5 and then refers to the Ca flow rate control map, thereby calculating a power generation required cathode flow rate associated with the required load.

The Ca flow rate control map is set such that the power generation required cathode flow rate increases as the required load increases. Therefore, the power generation flow rate calculation unit 251 increases the power generation required cathode flow rate as the required load increases. Then, the power generation flow rate calculation unit 251 outputs the power generation required cathode flow rate as an FC required cathode flow rate to the target flow rate setting unit 255.

Based on the required load from the load device 5, the oxygen consumption amount calculation unit 252 calculates an oxygen consumption amount indicative of a consumption flow rate of oxygen that is consumed by an electrochemical reaction in the fuel cell stack 1.

The oxygen consumption amount calculation unit 252 acquires a required load from the load device 5 and then multiplies the required load by a predetermined conversion value, thereby calculating an oxygen consumption flow rate in the fuel cell stack 1.

Based on the anode pressure value from the anode pressure sensor 37, the Ca discharged gas flow rate calculation unit 253 calculates a dilution required flow rate of a cathode discharged gas so that the hydrogen concentration in an exhaust gas that is discharged from the cathode gas discharge passage 26 to the atmosphere becomes equal to or less than a prescribed value, for example, 4%. The cathode discharged gas dilution required flow rate referred to herein is a cathode discharged gas flow rate that is necessary for dilution of hydrogen discharged from the purge valve 39. The Ca discharged gas flow rate calculation unit 253 corrects the cathode discharged gas dilution required flow rate according to the atmospheric pressure value from the atmospheric pressure sensor 201.

As shown in FIG. 9, a dilution requirement map showing the relationship between an anode pressure value and a cathode discharged gas dilution required flow rate per atmospheric pressure value is stored in the Ca discharged gas flow rate calculation unit 253. The Ca discharged gas flow rate calculation unit 253 acquires an anode pressure va37lue from the anode pressure sensor 37 and an atmospheric pressure value from the atmospheric pressure sensor 201 and then refers to the dilution requirement map corresponding to the atmospheric pressure value, thereby calculating a dilution required flow rate associated with the acquired anode pressure value.

The dilution requirement map is set such that the cathode discharged gas dilution required flow rate increases as the anode pressure value increases. The reason for this is that as the anode pressure value increases, the purge gas amount that is discharged from the purge valve 39 increases so that the hydrogen amount that is discharged into the cathode gas discharge passage 26 increases.

The dilution requirement map is set such that the cathode discharged gas dilution required flow rate decreases as the atmospheric pressure value increases. The reason for this is that as the atmospheric pressure value increases, the differential pressure between the pressure in the anode gas circulation passage 35 and the atmospheric pressure decreases so that the purge gas amount decreases.

The dilution required flow rate calculation unit 254 calculates a dilution required compressor flow rate indicative of a discharge amount of the compressor 22 necessary for dilution of hydrogen in a purge gas by adding the oxygen consumption flow rate from the oxygen consumption amount calculation unit 252 to the cathode discharged gas dilution required flow rate. The dilution required flow rate calculation unit 254 outputs the calculated dilution required compressor flow rate to the target flow rate setting unit 255.

The target flow rate setting unit 255 sets the greater value of the dilution required compressor flow rate and the FC required cathode flow rate from the power generation flow rate calculation unit 251 as a cathode gas target flow rate. The target flow rate setting unit 255 outputs the set cathode gas target flow rate to the Ca flow rate/pressure FB control unit 260.

In this way, by selecting the greater value of the cathode gas flow rate based on the dilution requirement and the cathode gas flow rate based on the power generation requirement, it is possible to maintain the hydrogen concentration of an exhaust gas of the fuel cell system 100 at the prescribed value or less while satisfying the required load.

Figure 10:
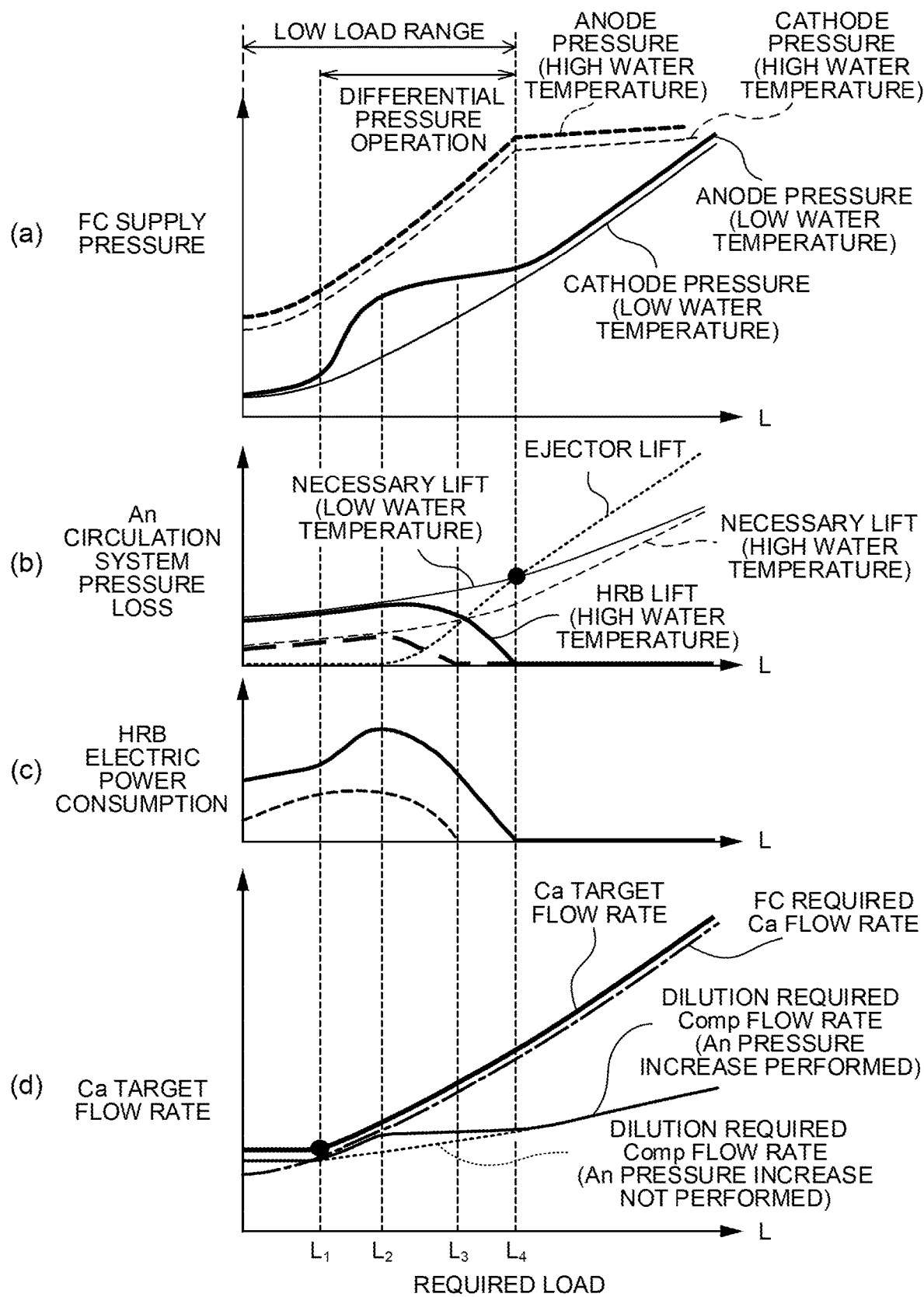
FIG. 10 is a diagram showing the changes in the operating state of the fuel cell system in this embodiment.

FIG. 10 is a diagram showing one example of the relationship between the required load to the fuel cell stack 1 and the operating state of the fuel cell system 100.

FIG. 10(a) shows the change in the anode pressure and the change in the cathode pressure in the fuel cell stack 1. In FIG. 10(a), the anode pressure is indicated by a thick line and the cathode pressure is indicated by a thin line.

FIG. 10(b) shows the changes in the pressure loss of the anode circulation system including the ejector 34 and the anode circulation pump 36. In FIG. 10(b), the necessary lift of the anode circulation system is indicated by a thin line, the lift of the ejector 34 is indicated by a dotted line, and the lift of the anode circulation pump 36 is indicated by a thick line. The lift of the anode circulation pump 36 referred to herein means a pressure increase amount of an anode discharged gas by the anode circulation pump 36.

The necessary lift of the anode circulation system means a pressure increase amount of an anode discharged gas that is necessary for achieving an anode gas circulation flow rate determined according to a required load. The anode gas circulation flow rate is determined so that hydrogen shortage does not occur at the downstream anode electrode of the fuel cell stack 1 when the required load becomes significantly high. For example, the anode gas circulation flow rate is calculated by multiplying a circulation flow rate minimally required for achieving the required load by a predetermined value greater than 1.0, and the necessary lift is determined based on the calculated anode gas circulation flow rate.

FIG. 10(c) shows the change in the electric power consumption of the anode circulation pump 36. In FIG. 10(a) to FIG. 10(c), the operating state of the fuel cell system 100 when the FC temperature is low is indicated by a solid line, and the operating state of the fuel cell system 100 when the FC temperature is high is indicated by a broken line.

FIG. 10(d) is a diagram showing the change in the target flow rate of a cathode gas. In FIG. 10(d), the dilution required compressor flow rate being the dilution required flow rate of a cathode gas is indicated by a solid line, and the FC required cathode flow rate being the power generation required flow rate of a cathode gas is indicated by a one-dot chain line.

The abscissa axes of FIG. 10(a) to FIG. 10(d) are common to all and represent the required load L to the fuel cell stack 1.

First, the operation of the fuel cell system 100 when the FC temperature is low will be described.

When the required load is in a first load range (extremely low load range) from zero to a load point $L_1$, the dilution required compressor flow rate is greater than the FC required cathode flow rate as shown in FIG. 10(d). Therefore, the dilution required compressor flow rate is set as a cathode gas target flow rate by the target flow rate setting unit 255 shown in FIG. 9.

In the first load range, according to the map of the Ca pressure calculation unit 240 shown in FIG. 8, the cathode pressure increases as the required load increases as shown in FIG. 10(a). At the same time, according to the map of the An pressure calculation unit 210 shown in FIG. 6, the anode pressure increases like the cathode pressure as the required load increases. That is, the differential pressure between the cathode pressure and the anode pressure does not increase.

The reason for this is that if the anode pressure is made greater than the cathode pressure in the first load range, since the dilution required compressor flow rate increases due to an increase in the amount of a purge gas, the cathode gas target flow rate increases. That is, if the anode pressure is increased, the electric power consumption of the compressor 22 increases. As a countermeasure for this, in the first load range where the dilution required compressor flow rate is greater than the FC required cathode flow rate, an increase in the anode pressure relative to the cathode pressure is suppressed. That is, in the low load range, an increase in the anode pressure is suppressed as the required load becomes lower.

Further, as shown in FIG. 10(b), since a pressure increase of an anode discharged gas is not performed by the ejector 34, the pressure of the anode discharged gas is increased by driving the anode circulation pump 36. Therefore, as shown in FIG. 10(c), the electric power consumption of the anode circulation pump 36 increases. The first load range is, for example, a range from zero percent to ten and several percent of the output range of the fuel cell stack 1.

When the required load is increased to the load point $L_1$, the FC required cathode flow rate becomes equal to the dilution required compressor flow rate as shown in FIG. 10(d). Then, when the required load is in a low load range from the load point $L_1$ to a load point $L_4$, the differential pressure operation that increases the inter-electrode differential pressure between the anode pressure and the cathode pressure is performed as shown in FIG. 10(a). Consequently, the necessary lift of the anode circulation system that is necessary for power generation of the fuel cell stack 1 decreases.

When the required load is in a second load range from the load point $L_1$ to a load point $L_2$, as shown in FIG. 10(a) and FIG. 10(b), the An pressure calculation unit 210 shown in FIG. 6 increases the anode pressure compared to the cathode pressure within a range where the dilution required compressor flow rate does not exceed the FC required cathode flow rate. In this example, the anode pressure is increased until the dilution required compressor flow rate becomes equal to the FC required cathode flow rate.

By increasing the anode pressure of the fuel cell stack 1 in the second load range, the pressure of an anode gas that is supplied to the ejector 34 increases, and therefore, the necessary lift of the anode circulation system decreases and, as shown in FIG. 10(b), the lift of the ejector 34 does not become minus, but is maintained constant. Therefore, as shown in FIG. 10(c), the electric power consumption of the anode circulation pump 36 is suppressed compared to when the anode pressure and the cathode pressure are made equal to each other. The second load range is, for example, a range from ten and several percent to twenty and several percent of the output range of the fuel cell stack 1.

When the required load is increased to the load point $L_2$, the lift of the ejector 34 starts to increase as shown in FIG. 10(b). Therefore, when the required load is in a third load range from the load point $L_2$ to a load point $L_3$, an increase amount of the anode pressure relative to the cathode pressure decreases as shown in FIG. 10(a). In this event, as shown in FIG. 10(d), the dilution required compressor flow rate becomes lower than the FC required cathode flow rate.

In the third load range, as shown in FIG. 10(b), the lift of the ejector 34 increases as the required load increases, and therefore, the lift of the anode circulation pump 36 decreases correspondingly. Therefore, the electric power consumption of the anode circulation pump 36 decreases as shown in FIG. 10(c). The third load range is, for example, a range from twenty and several percent to thirty and several percent of the output range of the fuel cell stack 1.

When the required load is increased to the load point $L_3$, the lift of the ejector 34 and the lift of the anode circulation pump 36 become equal to each other as shown in FIG. 10(b).

When the required load is in a fourth load range from the load point $L_3$ to the load point $L_4$, the lift of the anode circulation pump 36 becomes smaller than the lift of the ejector 34 as shown in FIG. 10(b), and the inter-electrode differential pressure between the cathode pressure and the anode pressure decreases as shown in FIG. 10(a).

When the required load is increased to the load point $L_4$, as shown in FIG. 10(b), since the lift of the ejector 34 increases to the necessary lift, the lift of the anode circulation pump 36 becomes zero or constant. In this event, the electric power consumption of the anode circulation pump 36 becomes zero or constant as shown in FIG. 10(c), and the anode pressure and the cathode pressure become equal to each other as shown in FIG. 10(a).

In this way, by increasing the anode pressure compared to the cathode pressure in the second load range to the fourth load range where the dilution required compressor flow rate is lower than the FC required cathode flow rate, it is possible to suppress an increase in the electric power consumption of the compressor 22.

When the required load is in a high load range higher than the load point $L_4$, the inter-electrode differential pressure between the anode pressure and the cathode pressure is maintained at zero or a predetermined value as shown in FIG. 10(a). Consequently, lowering of durability of the electrolyte membrane in the fuel cell stack 1 is suppressed.

In this way, by increasing the inter-electrode differential pressure between the cathode pressure and the anode pressure in the low load range from the load point $L_1$ to the load point $L_4$, it is possible to reduce the peak value of the electric power consumption of the anode circulation pump 36 at the load point $L_2$. Further, by increasing the anode pressure within the range where the dilution required compressor flow rate does not exceed the FC required cathode flow rate, it is possible to avoid an increase in the electric power consumption of the compressor 22.

Further, in the low load range where the required load is low, by suppressing an increase in the anode pressure in the first load range where the dilution required compressor flow rate becomes greater than the FC required cathode flow rate, it is possible to suppress an increase in the electric power consumption of the compressor 22. This greatly contributes to a reduction in the electric power consumption of the compressor 22 since the first load range is a range where the use ratio of the fuel cell stack 1 is high.

Next, the operation of the fuel cell system 100 when the FC temperature is high will be described.

In the low load range, as indicated by the dotted line in FIG. 10(a), the anode pressure when the FC temperature is high becomes higher than the anode pressure when the FC temperature is low. As shown in FIG. 10(b), the necessary lift when the FC temperature is high becomes smaller than the necessary lift when the FC temperature is low.

Therefore, as shown in FIG. 10(c), when the FC temperature is high, even unless the anode pressure is made higher than the cathode pressure, the electric power consumption of the anode circulation pump 36 becomes smaller than that when the FC temperature is low.

Therefore, as shown in FIG. 10(a), the inter-electrode differential pressure between the cathode pressure and the anode pressure is reduced when the FC temperature is high compared to when the FC temperature is low according to the map of the An pressure calculation unit 210 shown in FIG. 6. Consequently, it can be avoided that the anode gas circulation flow rate becomes excessive by unnecessarily increasing the anode pressure.

According to the second embodiment of the present invention, as shown in FIG. 10(a), the controller 200 increases the differential pressure between the cathode gas pressure and the anode gas pressure in the fuel cell stack 1 in the predetermined low load range. Consequently, like in the first embodiment, the electric power consumption of the anode circulation pump 36 can be partially reduced so that it is possible to reduce the size of the actuator that drives the anode circulation pump 36.

Further, according to this embodiment, as shown in FIG. 10(c), the controller 200 controls the power of the anode circulation pump 36 according to the magnitude of the required load in the predetermined low load range. The predetermined low load range referred to herein is set to a load range where the anode gas circulation flow rate by the ejector 34 becomes insufficient compared to a reference flow rate that is determined according to the required load. This reference flow rate is calculated by multiplying an anode gas flow rate necessary for power generation of the fuel cell stack 1 by, for example, 1.5.

Consequently, since the anode circulation pump 36 is driven so that the anode gas circulation flow rate becomes the reference flow rate, even when the required load is increased rapidly, it is possible to avoid the situation in which an anode gas becomes insufficient on the downstream side of the fuel cell stack 1. That is, it is possible to suppress performance degradation of the electrolyte membrane due to anode gas shortage.

The controller 200 increases the anode gas pressure compared to the cathode gas pressure in the predetermined low load range where the power of the anode circulation pump 36 increases. Consequently, since the peak value of the electric power consumption of the anode circulation pump 36 is reduced, it is possible to reduce the size of the anode circulation pump 36.

According to this embodiment, the fuel cell system 100 includes the purge valve 39 that discharges impurities contained in an anode discharged gas from the fuel cell stack 1, and the impurity discharge passage 38 that forms a gas passage for diluting a purge gas from the purge valve 39 with a cathode discharged gas from the fuel cell stack 1.

The controller 200 that controls the fuel cell system 100 increases the anode gas pressure compared to the cathode gas pressure in the predetermined low load range where it is possible to dilute a purge gas using a cathode gas that is supplied to the fuel cell stack 1.

The reason for this is that, as shown in FIG. 10(d), as long as the dilution required compressor flow rate does not exceed the FC required cathode flow rate due to an increase in the anode gas pressure, the power of the compressor 22 does not increase. Therefore, in this embodiment, since the anode gas pressure is increased in the state where the dilution required compressor flow rate becomes less than the FC required cathode flow rate, it is possible to suppress an increase in the electric power consumption of the compressor 22 while reducing the electric power consumption of the anode circulation pump 36.

According to this embodiment, using the map held in the An pressure calculation unit 210 shown in FIG. 6, the controller 200 reduces the differential pressure between the cathode gas pressure and the anode gas pressure as the temperature of the fuel cell stack 1 becomes higher.

Since the cathode gas pressure increases as the temperature of the fuel cell stack 1 becomes higher like in the map of the Ca pressure calculation unit 240 shown in FIG. 8, if the anode gas pressure is increased by a certain amount using the cathode gas pressure as a reference, the anode gas pressure is unnecessarily increased.

As a countermeasure for this, the controller 200 of this embodiment reduces the differential pressure between the cathode gas pressure and the anode gas pressure as the temperature of the fuel cell stack 1 becomes higher. Consequently, it is possible to avoid unnecessarily increasing the anode gas pressure so that the discharge amount of a purge gas and the leak amount of hydrogen from the anode electrode to the cathode electrode are prevented from being unnecessarily increased, and therefore, it is possible to suppress degradation of fuel economy.

Although the example in which the inter-electrode differential pressure between the cathode gas pressure and the anode gas pressure is reduced as the temperature of the fuel cell stack 1 becomes higher has been described in this embodiment, the opening degree of the anode pressure control valve 33 may be controlled so that the inter-electrode differential pressure decreases as the cathode gas pressure increases.

For example, a map showing the relationship between a required load and an anode pressure per cathode pressure value is stored in the An pressure calculation unit 210 instead of the map shown in FIG. 6, and the An pressure calculation unit 210 acquires a detection value from the cathode pressure sensor 25 or a cathode gas target pressure and then refers to the map corresponding to the acquired value, thereby calculating an anode gas target pressure. Even with this configuration, it is possible to obtain the same operation and effect as those of this embodiment.

According to this embodiment, the An pressure calculation unit 210 shown in FIG. 6 holds the map in which a value greater than an anode gas power generation required pressure that is necessary for power generation of the fuel cell stack 1 is set as an anode gas target pressure when the required load is low compared to when the required load is high. A control unit being the An pressure calculation unit 210 acquires a required load and then refers to the map, thereby controlling the pressure of an anode gas, that is supplied to the fuel cell stack 1, to the target pressure. Consequently, an increase in the anode gas pressure in the low load range can be realized with the simple configuration.

Particularly, the map held in the An pressure calculation unit 210 is set such that the anode gas target pressure increases as the required load increases and that the characteristics of the anode gas target pressure has the convex portion in the low load range where the required load is low.

Consequently, as shown in FIG. 10(a), the inter-electrode differential pressure can be suppressed to approximately zero in the extremely low load range (zero to $L_1$), where the load is low, of the low load range (zero to $L_4$). In this way, it is possible to suppress an increase in the anode gas pressure as the required load becomes lower in the low load range (zero to $L_4$).

The reason for this is that, as shown in FIG. 10(d), the dilution required compressor flow rate becomes greater than the FC required cathode flow rate in the extremely low load range (zero to $L_1$). Therefore, when the anode gas pressure is increased, the dilution required compressor flow rate that is set as the cathode gas target flow rate increases, so that the electric power consumption of the compressor 22 increases.

As a countermeasure for this, in this embodiment, by setting the map in which the characteristics of the anode gas target pressure has the convex portion in the low load range, an increase in the anode gas pressure in the extremely low load range is suppressed, and therefore, it is possible to suppress an increase in the electric power consumption of the compressor 22.

In the fuel cell stack 1, when the electrolyte membrane of the fuel cell is too dry, the power generation performance decreases, and when the electrolyte membrane is too wet, since the electrolyte membrane is subjected to clogging, the power generation performance also decreases. Therefore, it is preferable that the wet/dry state (water content) of the electrolyte membrane be controlled to a state suitable for power generation of the fuel cell. Accordingly, an embodiment of a fuel cell system that controls the wet/dry state of the electrolyte membrane will be described hereinafter.

Third Embodiment

Figure 11:
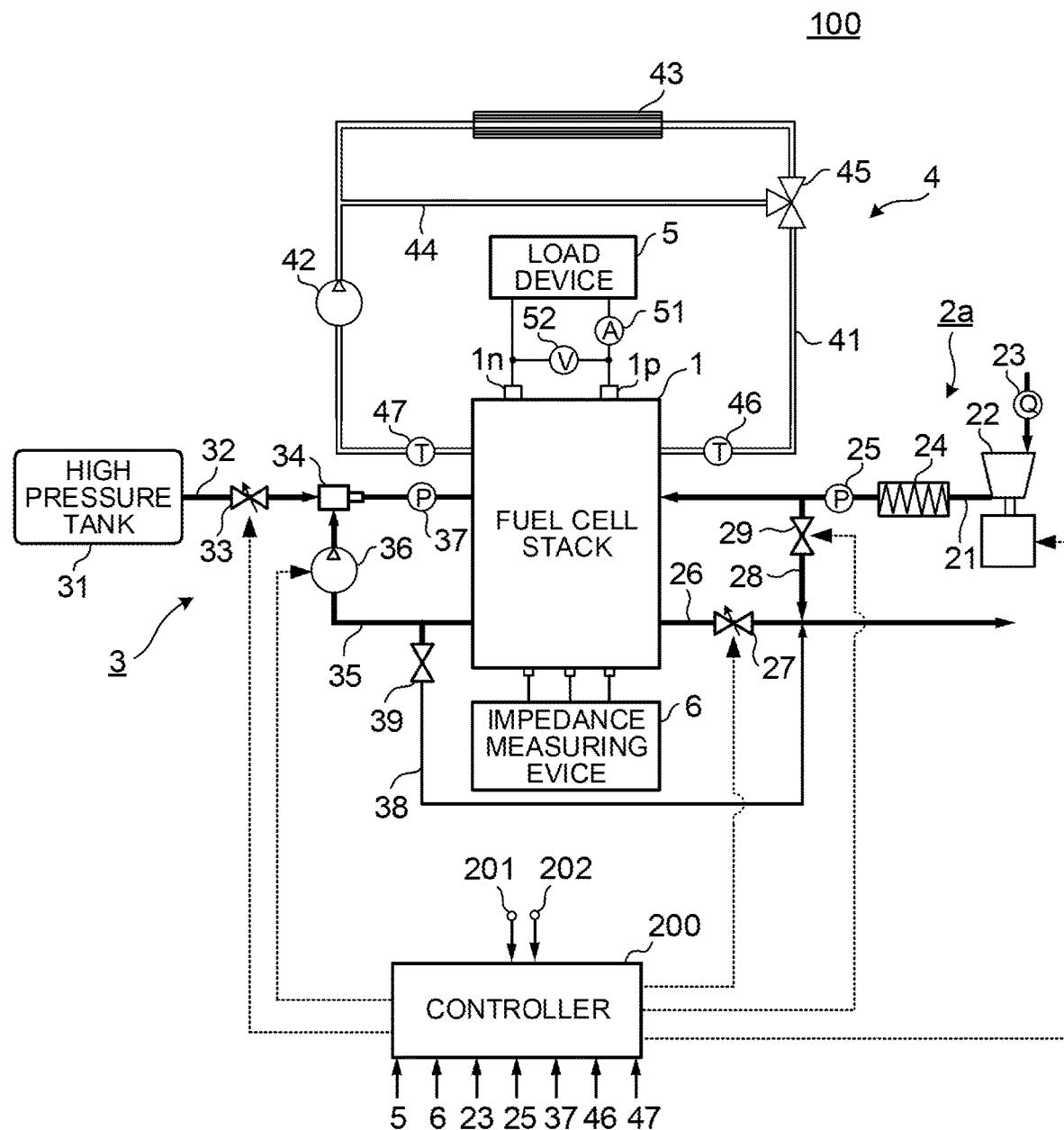
FIG. 11 is a configuration diagram showing a configuration example of a fuel cell system in a third embodiment of the present invention.

FIG. 11 is a configuration diagram showing a configuration example of a fuel cell system 101 in a third embodiment of the present invention.

The fuel cell system 101 includes an impedance measuring device 6 in addition to the configuration of the fuel cell system 100 shown in FIG. 1. Further, the fuel cell system 101 includes a cathode gas supply/discharge device 2a instead of the cathode gas supply/discharge device 2 of the fuel cell system 100.

The cathode gas supply/discharge device 2a includes a cathode bypass passage 28 and a bypass valve 29 in addition to the configuration of the cathode gas supply/discharge device 2 shown in FIG. 1.

The cathode bypass passage 28 is a passage that is provided between the cathode gas supply passage 21 and the cathode gas discharge passage 26 so that part of a cathode gas supplied from the compressor 22 is discharged to the outside by bypassing the fuel cell stack 1. The cathode bypass passage 28 has one end connected to the cathode gas supply passage 21 between the intercooler 24 and the fuel cell stack 1 and the other end connected to the cathode gas discharge passage 26 downstream of the cathode pressure control valve 27.

The bypass valve 29 is provided in the cathode bypass passage 28. The bypass valve 29 adjusts the cathode gas flow rate at which part of a cathode gas supplied from the compressor 22 is discharged to the cathode gas discharge passage 26. For example, a solenoid valve capable of changing the valve opening degree stepwise is used as the bypass valve 29. The opening degree of the bypass valve 29 is controlled by the controller 200.

In the state where the dilution required compressor flow rate becomes greater than the power generation required cathode flow rate, the manipulated variable of the compressor 22 is, normally, controlled so that the compressor flow rate becomes the dilution required compressor flow rate. In such a case, in the fuel cell system 100 shown in FIG. 1, since the cathode bypass passage 28 is not provided, the cathode gas flow rate to the fuel cell stack 1 becomes greater than the power generation required cathode flow rate. As a result, water that is taken out of the fuel cell stack 1 due to excess cathode gas increases so that there is a possibility that the electrolyte membrane is dried.

Therefore, when the dilution required compressor flow rate becomes greater than the power generation required cathode flow rate, the opening degree of the bypass valve 29 is controlled by the controller 200 so that the flow rate of a cathode gas that is supplied to the fuel cell stack 1 does not exceed the power generation required cathode flow rate.

The impedance measuring device 6 is a device that detects a wet/dry state of the electrolyte membrane. The impedance measuring device 6 measures the internal impedance of the fuel cell stack 1 that is correlated with the wet/dry state of the electrolyte membrane. The impedance measuring device 6 outputs the measured internal impedance to the controller 200.

Generally, as the water content of the electrolyte membrane decreases, i.e. as the electrolyte membrane becomes drier, the electrical resistance component of the internal impedance increases. On the other hand, as the water content of the electrolyte membrane increases, i.e. as the electrolyte membrane becomes wetter, the electrical resistance component of the internal impedance decreases. Therefore, in this embodiment, the internal impedance of the fuel cell stack 1 is used as a parameter indicative of a wet/dry state of the electrolyte membrane.

The fuel cell stack 1 is provided with a positive electrode tab connected in series to the positive electrode terminal 1p and a negative electrode tab connected in series to the negative electrode terminal 1n, and the impedance measuring device 6 is connected to the positive electrode tab and the negative electrode tab.

The impedance measuring device 6 supplies an alternating current having a predetermined frequency suitable for measuring the electrical resistance of the electrolyte membrane to the positive electrode terminal 1p and detects an AC voltage generated across the positive electrode terminal 1p and the negative electrode terminal 1n. The impedance measuring device 6 calculates an internal impedance by dividing an amplitude of the detected AC voltage by an amplitude of the alternating current supplied to the positive electrode terminal 1p. Hereinafter, the calculated internal impedance will be referred to as an HFR (High Frequency Resistance).

In addition to the input signals described in the first embodiment, an HFR of the fuel cell stack 1 that is output from the impedance measuring device 6 and an output signal of an INV temperature sensor 202 that detects a temperature of an HRB inverter not illustrated are input into the controller 200 of this embodiment. The HRB inverter converts electric power, that is output from the fuel cell stack 1 or a battery, into AC power and supplies the converted AC power to the motor of the anode circulation pump 36.

According to the HFR from the impedance measuring device 6, the controller 200 controls the manipulated variable of the compressor 22, the opening degree of the cathode pressure control valve 27, and the rotational speed of the anode circulation pump 36 within a range where the required load from the load device 5 can be realized by the fuel cell stack 1. In this embodiment, as the rotational speed of the anode circulation pump 36 increases, the amount of water that is reserved in the anode circulation system increases, and therefore, the electrolyte membrane of the fuel cell stack 1 becomes wetter.

For example, when the HFR of the fuel cell stack 1 is greater than a target value, i.e. when the electrolyte membrane is dry, the controller 200 reduces the flow rate of a cathode gas, increases the pressure of the cathode gas, and increases the rotational speed of the anode circulation pump 36 within the range where the required load can be realized.

On the other hand, when the HFR of the fuel cell stack 1 is smaller than the target value, the controller 200 increases the flow rate of a cathode gas, reduces the pressure of the cathode gas, and reduces the rotational speed of the anode circulation pump 36 within the range where the required load can be achieved.

Figure 12:
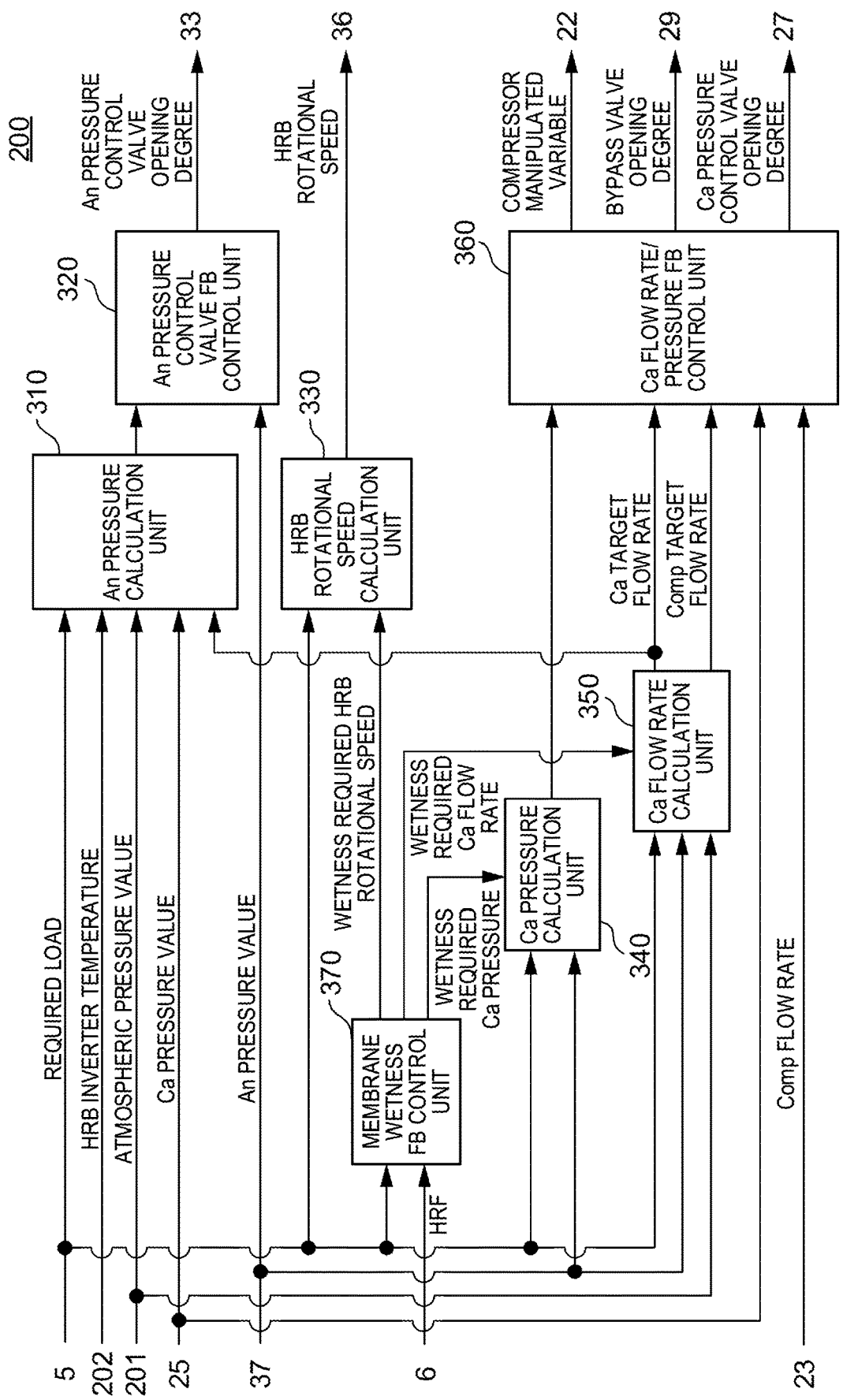
FIG. 12 is a block diagram showing a functional configuration example of a controller in this embodiment.

FIG. 12 is a block diagram showing a functional configuration example of the controller 200 in the third embodiment of the present invention.

The controller 200 of this embodiment includes an An pressure calculation unit 310, an An pressure control valve FB control unit 320, an HRB rotational speed calculation unit 330, a Ca pressure calculation unit 340, a Ca flow rate calculation unit 350, a Ca flow rate/pressure FB control unit 360, and a membrane wetness FB control unit 370.

The configurations of the controller 200 other than the membrane wetness FB control unit 370 are basically the same as those of the second embodiment. Herein, the configuration of the membrane wetness FB control unit 370 will mainly be described in detail, and thereafter, the configurations of the An pressure calculation unit 310, the HRB rotational speed calculation unit 330, the Ca pressure calculation unit 340, and the Ca flow rate calculation unit 350 whose input parameters are different compared to the second embodiment will be briefly described.

Based on the required load from the load device 5 and the HFR from the impedance measuring device 6, the membrane wetness FB control unit 370 calculates an HRB rotational speed, a cathode pressure, and a cathode flow rate that are necessary for controlling the wet/dry state of the fuel cell stack 1 to a target state. Hereinafter, these parameters will be respectively referred to as a "wetness required HRB rotational speed", a "wetness required cathode pressure", and a "wetness required cathode flow rate".

For example, a wetness control map showing the relationship between a target HFR of the fuel cell stack 1 and a required load is stored in advance in the membrane wetness FB control unit 370. The target HFR referred to herein is determined through an experiment or the like so that the electrolyte membrane of the fuel cell is maintained in a target state suitable for power generation. For example, the target HFR is determined per required load in consideration of the amount of water that is produced in the fuel cell stack 1, the amount of water that is taken out of the fuel cell stack 1 due to a cathode discharged gas, and so on.

The membrane wetness FB control unit 370 acquires a required load to the fuel cell stack 1 from the load device 5 and then refers to the wetness control map, thereby calculating a target HFR associated with the required load. Then, the membrane wetness FB control unit 370 performs feedback control of the wetness required HRB rotational speed, the wetness required cathode pressure, and the wetness required cathode flow rate so that the HFR from the impedance measuring device 6 becomes the target HFR.

As the HFR of the fuel cell stack 1 becomes greater than the target HFR, i.e. as the electrolyte membrane becomes drier, the wetness required HRB rotational speed is increased, the wetness required cathode pressure is increased, and the wetness required cathode flow rate is reduced. Since the amount of water in the anode circulation system increases by increasing the wetness required HRB rotational speed, the electrolyte membrane of the fuel cell stack 1 tends to be wet. Since the amount of water that is taken out of the fuel cell stack 1 due to a cathode gas decreases by increasing the wetness required cathode pressure and reducing the wetness required cathode flow rate, the electrolyte membrane further tends to be wet.

On the other hand, as the HFR of the fuel cell stack 1 becomes smaller than the target HFR, i.e. as the electrolyte membrane becomes wetter, the wetness required HRB rotational speed is reduced, the wetness required cathode pressure is reduced, and the wetness required cathode flow rate is increased. Consequently, the electrolyte membrane of the fuel cell stack 1 tends to be dry.

The membrane wetness FB control unit 370 outputs the wetness required HRB rotational speed to the HRB rotational speed calculation unit 330, the wetness required cathode pressure to the Ca pressure calculation unit 340, and the wetness required cathode flow rate to the Ca flow rate calculation unit 350.

The An pressure calculation unit 310 corresponds to the An pressure calculation unit 210 of the second embodiment. The An pressure calculation unit 310 calculates an anode gas target pressure based on a required load from the load device 5, an HRB inverter temperature, an atmospheric pressure value from the atmospheric pressure sensor 201, a cathode pressure value from the cathode pressure sensor 25, and a cathode gas target flow rate. Details of the An pressure calculation unit 310 will be described later with reference to FIG. 13.

The An pressure control valve FB control unit 320 has the same function as the An pressure control valve FB control unit 220 of the second embodiment.

The HRB rotational speed calculation unit 330 corresponds to the HRB rotational speed calculation unit 230 of the second embodiment. The HRB rotational speed calculation unit 330 calculates a target rotational speed of the anode circulation pump 36 based on the required load from the load device 5 and the wetness required HRB rotational speed from the membrane wetness FB control unit 370. Details of the HRB rotational speed calculation unit 330 will be described later with reference to FIG. 18.

The Ca pressure calculation unit 340 corresponds to the Ca pressure calculation unit 240 of the second embodiment. The Ca pressure calculation unit 340 calculates a cathode gas target pressure based on the required load from the load device 5 and an anode pressure value from the anode pressure sensor 37. Details of the Ca pressure calculation unit 340 will be described later with reference to FIG. 19.

The Ca flow rate calculation unit 350 corresponds to the Ca flow rate calculation unit 250 of the second embodiment. The Ca flow rate calculation unit 350 calculates a compressor target flow rate and a cathode target flow rate based on the required load from the load device 5, the anode pressure value from the anode pressure sensor 37, and the atmospheric pressure value from the atmospheric pressure sensor 201.

The compressor target flow rate is a parameter indicative of a target value of a cathode gas flow rate to be discharged from the compressor 22. The cathode target flow rate is a parameter indicative of a target value of a cathode gas flow rate to be supplied to the fuel cell stack 1.

The Ca flow rate calculation unit 350 outputs the cathode target flow rate to the An pressure calculation unit 310 and outputs the compressor target flow rate and the cathode target flow rate to the Ca flow rate/pressure FB control unit 360. Details of the Ca flow rate calculation unit 350 will be described later with reference to FIG. 20.

The Ca flow rate/pressure FB control unit 360 corresponds to the Ca flow rate/pressure FB control unit 260 of the second embodiment. Like in the second embodiment, the Ca flow rate/pressure FB control unit 360 controls the manipulated variable of the compressor 22 and the opening degree of the cathode pressure control valve 27 based on the cathode gas target pressure, the compressor target flow rate, the cathode pressure value from the cathode pressure sensor 25, and a compressor flow rate from the flow rate sensor 23.

Further, the Ca flow rate/pressure FB control unit 360 controls the opening degree of the bypass valve 29 based on the compressor target flow rate and the cathode target flow rate. For example, the Ca flow rate/pressure FB control unit 360 refers to a predetermined map and controls the opening degree of the bypass valve 29 so that the flow rate of a cathode gas that flows in the cathode bypass passage 28 becomes a bypass flow rate calculated by subtracting the cathode target flow rate from the compressor target flow rate.

A sensor that detects a flow rate of a cathode gas that is supplied to the fuel cell stack 1 may be provided in the cathode gas supply passage 21, and feedback control of the opening degree of the bypass valve 29 may be performed so that a detection value of the sensor becomes the cathode target flow rate.

Figure 13:
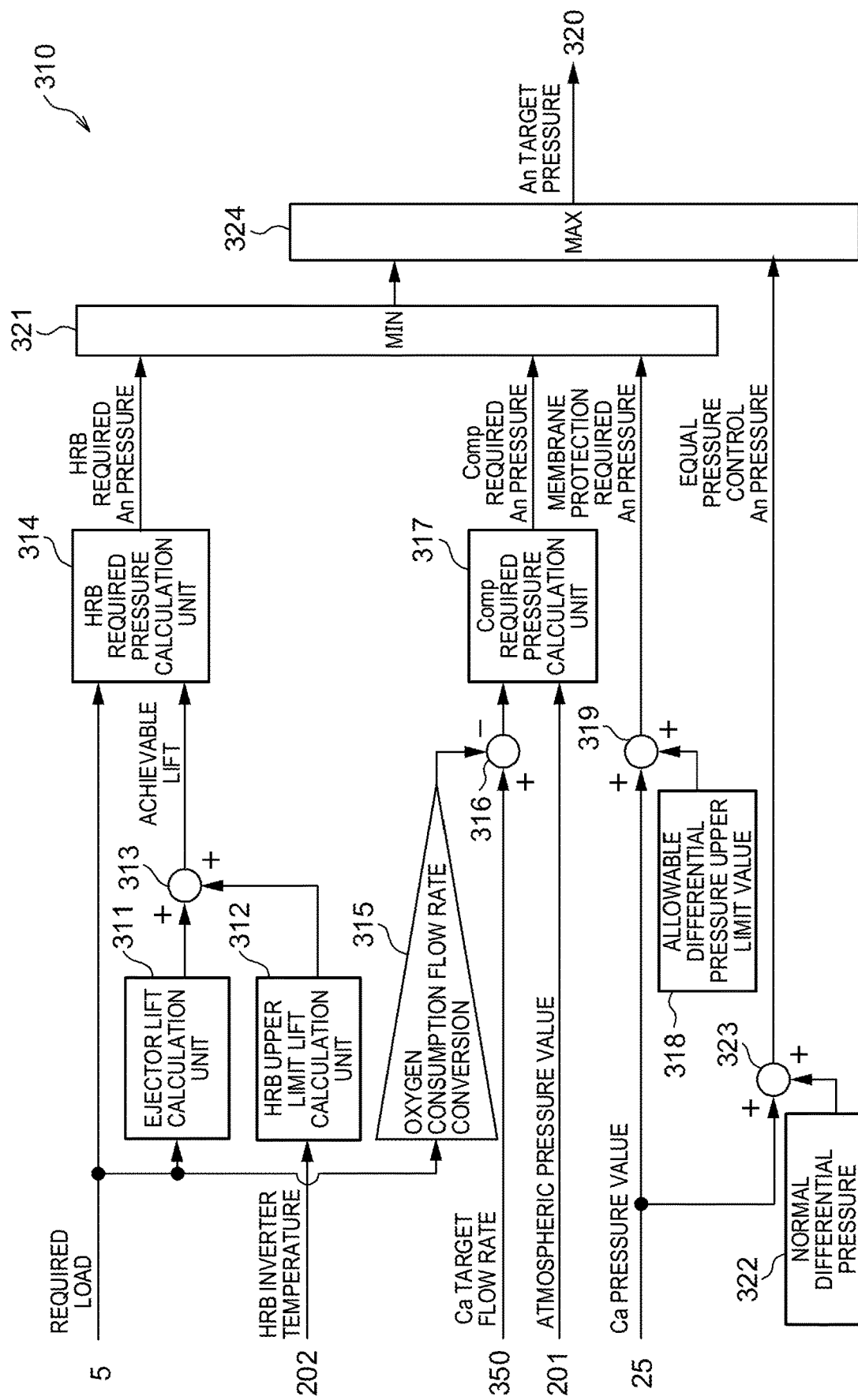
FIG. 13 is a block diagram showing a functional configuration that calculates a target pressure of an anode gas according to a wetness requirement to a fuel cell.

FIG. 13 is a block diagram showing a detailed configuration example of the An pressure calculation unit 310 in this embodiment. FIGS. 14 to 17 are diagrams for explaining maps stored in the An pressure calculation unit 310.

The An pressure calculation unit 310 includes an ejector lift calculation unit 311, an HRB upper limit lift calculation unit 312, an adder 313, and an HRB required pressure calculation unit 314. Further, the An pressure calculation unit 310 includes an oxygen consumption amount calculation unit 315, a Ca discharged gas flow rate calculation unit 316, a Comp required pressure calculation unit 317, an allowable differential pressure value holding unit 318, a membrane protection required pressure calculation unit 319, and a pressure increase setting unit 321. Further, the An pressure calculation unit 310 includes a normal differential pressure value holding unit 322, an equal pressure control pressure calculation unit 323, and an An target pressure setting unit 324.

The ejector lift calculation unit 311 calculates an ejector estimation lift indicative of an estimation value of a lift (pressure increase amount) of the ejector 34 based on the required load from the load device 5. The lift of the ejector 34 is determined by an ejection flow rate of an anode gas that is ejected from the nozzle of the ejector 34, and the ejection flow rate of the ejector 34 is proportional to the required load. Therefore, the ejector lift calculation unit 311 increases the ejector estimation lift as the required load increases.

Figure 14:
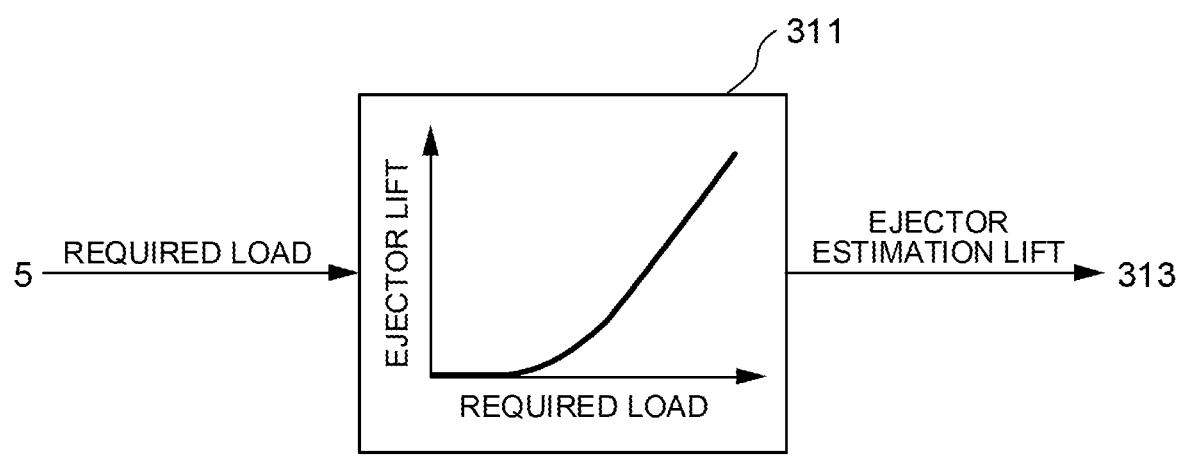
FIG. 14 is a block diagram showing a functional configuration that calculates a pressure increase amount of an anode discharged gas by an ejector based on a required load.

In this embodiment, as shown in FIG. 14, an ejector lift calculation map showing the relationship between a required load and an ejector estimation lift is stored in the ejector lift calculation unit 311. The ejector lift calculation unit 311 acquires a required load from the load device 5 and then refers to the ejector lift calculation map, thereby calculating an ejector estimation lift associated with the required load.

The lift calculation map is set such that the lift of the ejector 34 is zero in the low load range and that the ejector estimation lift increases as the required load increases in the medium-high load range. This is because the lift of the ejector 34 is designed to be large in the high load range.

The HRB upper limit lift calculation unit 312 calculates an HRB upper limit lift indicative of an upper limit value of the pressure increase amount of the anode circulation pump 36 based on the HRB inverter temperature from the INV temperature sensor 202.

The inverter of the anode circulation pump 36 limits electric power that is supplied to the anode circulation pump 36, thereby preventing damage that is otherwise caused by the temperature of a switching element provided inside becoming too high. Therefore, the HRB upper limit lift calculation unit 312 reduces the HRB upper limit lift when the HRB inverter temperature becomes higher than a predetermined threshold value. The predetermined threshold value is determined through an experiment or the like.

Figure 15:
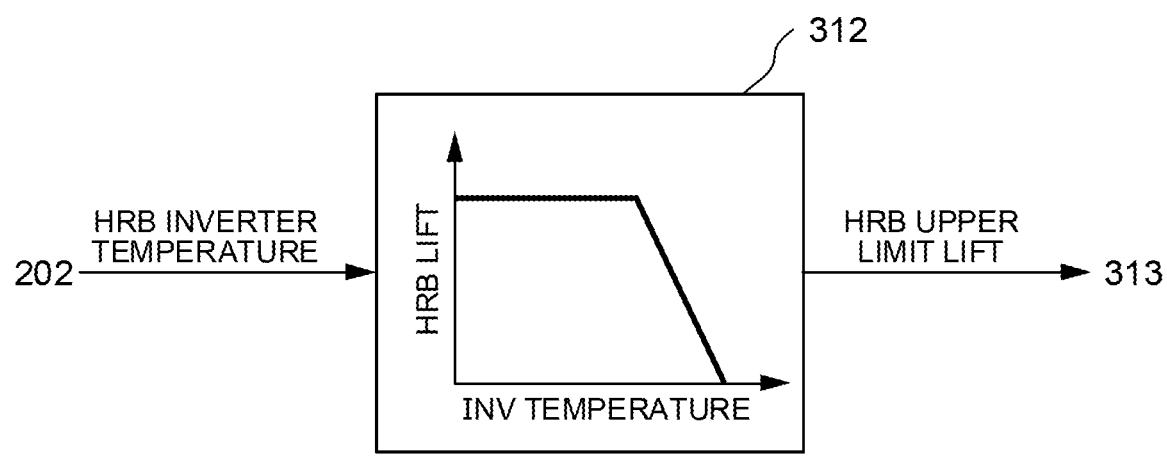
FIG. 15 is a block diagram showing a functional configuration that calculates an upper limit pressure increase amount by an anode circulation pump based on a temperature of an inverter for the anode circulation pump.

In this embodiment, as shown in FIG. 15, an HRB limitation map showing the relationship between an HRB inverter temperature and an HRB upper limit lift is stored in the HRB upper limit lift calculation unit 312. The HRB upper limit lift calculation unit 312 acquires an HRB inverter temperature from the INV temperature sensor 202 and then refers to the HRB limitation map, thereby calculating an HRB upper limit lift associated with the HRB inverter temperature.

The HRB limitation map is set such that the HRB upper limit lift takes a constant value in a temperature range where the HRB inverter temperature is from zero to a predetermined threshold value. This temperature range is a temperature range where the temperature of the switching element of the inverter does not become too high and the possibility of damage to the switching element is extremely low.

The HRB limitation map is set such that the HRB upper limit lift decreases as the HRB inverter temperature increases in a temperature range where the HRB inverter temperature is higher than the predetermined threshold value. In this temperature range, electric power to be supplied to the anode circulation pump 36 is limited so that the temperature of the switching element does not exceed an upper limit temperature.

Although the example in which the HRB upper limit lift is calculated using the temperature of the inverter for the anode circulation pump 36 has been described in this embodiment, the temperature of the switching element in the inverter, the temperature of the motor that drives the anode circulation pump, or the like may be used instead of the temperature of the inverter. Even using such a parameter, it is possible to make a calculation error of the HRB upper limit lift small.

The adder 313 adds the HRB upper limit lift and the ejector estimation lift together, thereby calculating an achievable lift by the ejector 34 and the anode circulation pump 36. The achievable lift referred to herein is an upper limit value of the pressure increase amount to which the pressure of an anode discharged gas can be increased using both the ejector 34 and the anode circulation pump 36.

Based on the required load from the load device 5, the HRB required pressure calculation unit 314 calculates an HRB required anode pressure indicative of an anode pressure that is required for reducing the power of the anode circulation pump 36. Further, the HRB required pressure calculation unit 314 corrects the HRB required anode pressure according to the achievable lift from the adder 313.

Figure 16:
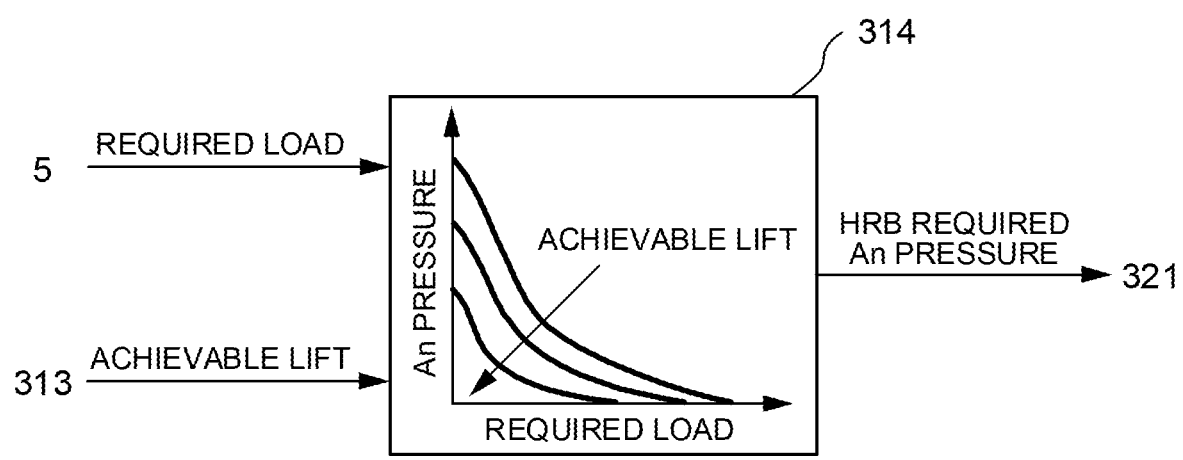
FIG. 16 is a block diagram showing a functional configuration that calculates an anode gas pressure for power reduction of the anode circulation pump.

In this embodiment, as shown in FIG. 16, an HRB power reduction map showing the relationship between a required load and an HRB required anode pressure per achievable lift of the anode circulation system is stored in the HRB required pressure calculation unit 314. The HRB required pressure calculation unit 314 acquires a required load from the load device 5 and an achievable lift from the adder 313 and then refers to the HRB power reduction map corresponding to the achievable lift, thereby calculating an HRB required anode pressure associated with the acquired required load.

The HRB power reduction map is set such that the HRB required anode pressure decreases as the required load increases. This is because since the lift of the ejector 34 increases as the required load increases as shown in FIG. 2(a), it is possible to reduce the power of the anode circulation pump 36 in the high load range.

Further, the slope (decreasing rate) of the anode pressure with respect to the required load in the low load range is greater than that in the high load range. This is because since the power of the anode circulation pump 36 increases in the low load range, by increasing the HRB required anode pressure as the required load decreases in the low load range, the power of the anode circulation pump 36 can be more reduced than in the high load range. Consequently, it is possible to reduce the power of the anode circulation pump 36 and thus to reduce the size of the anode circulation pump 36.

The HRB power reduction map is set such that the HRB required anode pressure decreases as the achievable lift of the anode circulation system increases. This is to suppress increasing the anode pressure to unnecessarily increase the anode gas supply amount or increase the differential pressure between the anode pressure and the cathode pressure even in the state where the total lift by the ejector 34 and the anode circulation pump 36 is sufficiently achieved. Consequently, in the high load range, since the lift of the ejector 34 becomes sufficiently large as shown in FIG. 2(a), an increase in the anode pressure can be made small.

By setting the HRB power reduction map as described above, as shown in FIGS. 3(b) and 10(b), while reducing the peak of the electric power consumption of the anode circulation pump 36 in the low load range, it is possible to make the differential pressure between the anode pressure and the cathode pressure small in the high load range.

The HRB required pressure calculation unit 314 outputs the calculated HRB required anode pressure to the pressure increase setting unit 321.

Like the oxygen consumption amount calculation unit 252 shown in FIG. 9, the oxygen consumption amount calculation unit 315 multiplies a required load from the load device 5 by a predetermined conversion value, thereby calculating an oxygen consumption flow rate in the fuel cell stack 1.

The Ca discharged gas flow rate calculation unit 316 subtracts the oxygen consumption flow rate from a cathode gas target flow rate from the Ca flow rate calculation unit 350, thereby calculating a cathode discharged gas flow rate indicative of a flow rate of a cathode discharged gas that is discharged from the fuel cell stack 1.

The Comp required pressure calculation unit 317 calculates a Comp required anode pressure indicative of an anode pressure that is required for reducing the power of the compressor 22. Further, the Comp required pressure calculation unit 317 corrects the Comp required anode pressure according to an atmospheric pressure value from the atmospheric pressure sensor 201.

The Comp required anode pressure referred to herein is a parameter indicative of an upper limit value of the anode pressure at which hydrogen in a purge gas can be diluted using only a cathode discharged gas. "hydrogen in a purge gas can be diluted" referred to herein means that the hydrogen concentration in an exhaust gas of the fuel cell system 101 can be maintained at a prescribed value or less. That is, the Comp required anode pressure is a parameter that limits the HRB required anode pressure for suppressing an increase in the electric power consumption of the compressor 22.

Figure 17:
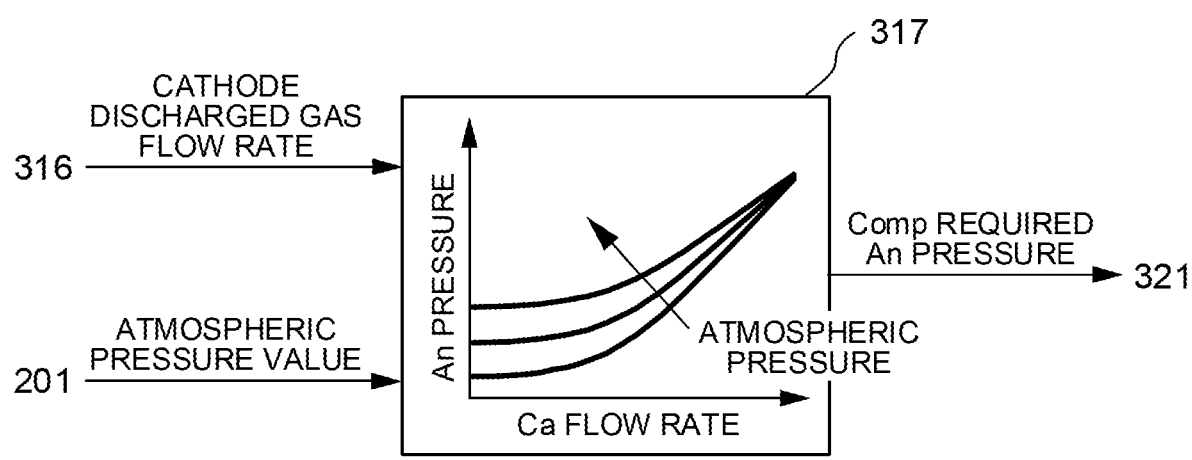
FIG. 17 is a block diagram showing a functional configuration that calculates an anode gas pressure for suppressing power increase of a compressor that supplies a cathode gas.

In this embodiment, as shown in FIG. 17, a Comp limitation map showing the relationship between a cathode discharged gas flow rate of the fuel cell stack 1 and a Comp required anode pressure per atmospheric pressure is stored in the Comp required pressure calculation unit 317. The Comp required pressure calculation unit 317 acquires a cathode discharged gas flow rate from the Ca discharged gas flow rate calculation unit 316 and an atmospheric pressure value from the atmospheric pressure sensor 201. Then, the Comp required pressure calculation unit 317 refers to the Comp limitation map corresponding to the atmospheric pressure value, thereby calculating a Comp required anode pressure associated with the acquired cathode discharged gas flow rate.

The Comp limitation map is set such that the Comp required anode pressure increases as the cathode discharged gas flow rate increases. This is because as the cathode discharged gas flow rate increases, the increase width of the anode pressure can be increased without increasing the power of the compressor 22.

Further, the Comp limitation map is set such that the Comp required anode pressure increases as the atmospheric pressure value increases. This is because as the atmospheric pressure value increases, the leak amount of hydrogen from the anode electrode to the cathode electrode and the discharge amount of a purge gas from the purge valve 39 to the atmosphere decrease so that it is possible to increase the anode pressure correspondingly.

In this way, using the Comp limitation map, the Comp required pressure calculation unit 317 calculates an upper limit value of the anode pressure at which a purge gas can be diluted only with the cathode discharged gas flow rate from the fuel cell stack 1. Consequently, the controller 200 can increase the anode pressure so that the cathode gas dilution flow rate that is necessary for dilution of a purge gas becomes equal to or less than the supply flow rate of a cathode gas to the fuel cell stack 1.

The Comp required pressure calculation unit 317 outputs the calculated Comp required anode pressure to the pressure increase setting unit 321.

The allowable differential pressure value holding unit 318 holds an allowable differential pressure upper limit value indicative of an upper limit value of the differential pressure between the cathode pressure and the anode pressure that can be allowed by the electrolyte membrane of the fuel cell stack 1.

The membrane protection required pressure calculation unit 319 adds the allowable differential pressure upper limit value to a cathode pressure value from the cathode pressure sensor 25, thereby calculating a membrane protection required anode pressure indicative of an anode pressure that is required for protecting the electrolyte membrane. The membrane protection required pressure calculation unit 319 outputs the membrane protection required anode pressure to the pressure increase setting unit 321.

The pressure increase setting unit 321 outputs, as a pressure increase required anode pressure, the smallest value among the HRB required anode pressure, the Comp required anode pressure, and the membrane protection required anode pressure to the An target pressure setting unit 324.

For example, when the required load is in the second load range from the load point $L_1$ to the load point $L_2$ in FIG. 10, the HRB required anode pressure becomes greater than the Comp required anode pressure, and therefore, the pressure increase setting unit 321 sets the Comp required anode pressure as a pressure increase required anode pressure.

When the required load is in the third load range from the load point $L_2$ to the load point $L_3$ in FIG. 10, the HRB required anode pressure becomes smaller than the Comp required anode pressure, and therefore, the pressure increase setting unit 321 sets the HRB required anode pressure as a pressure increase required anode pressure.

The normal differential pressure value holding unit 322 holds a normal differential pressure reference value indicative of a reference value of the inter-electrode differential pressure between the cathode pressure and the anode pressure during normal power generation control. For example, the normal differential pressure reference value is set to zero (0) or a value taking into account an error of differential pressure control.

The equal pressure control pressure calculation unit 323 adds the normal differential pressure reference value to a cathode pressure value from the cathode pressure sensor 25, thereby calculating an equal pressure control anode pressure indicative of an anode pressure for making the cathode pressure and the anode pressure equal to each other. The equal pressure control pressure calculation unit 323 outputs the equal pressure control anode pressure to the An target pressure setting unit 324. Consequently, it is possible to maintain durability of the electrolyte membrane and to suppress an increase in the amount of a purge gas to thereby suppress the power of the compressor 22.

The An target pressure setting unit 324 sets the greater value of the pressure increase required anode pressure and the equal pressure control anode pressure as an anode gas target pressure. Then, the An target pressure setting unit 324 outputs the anode gas target pressure to the An pressure control valve FB control unit 320.

Figure 18:
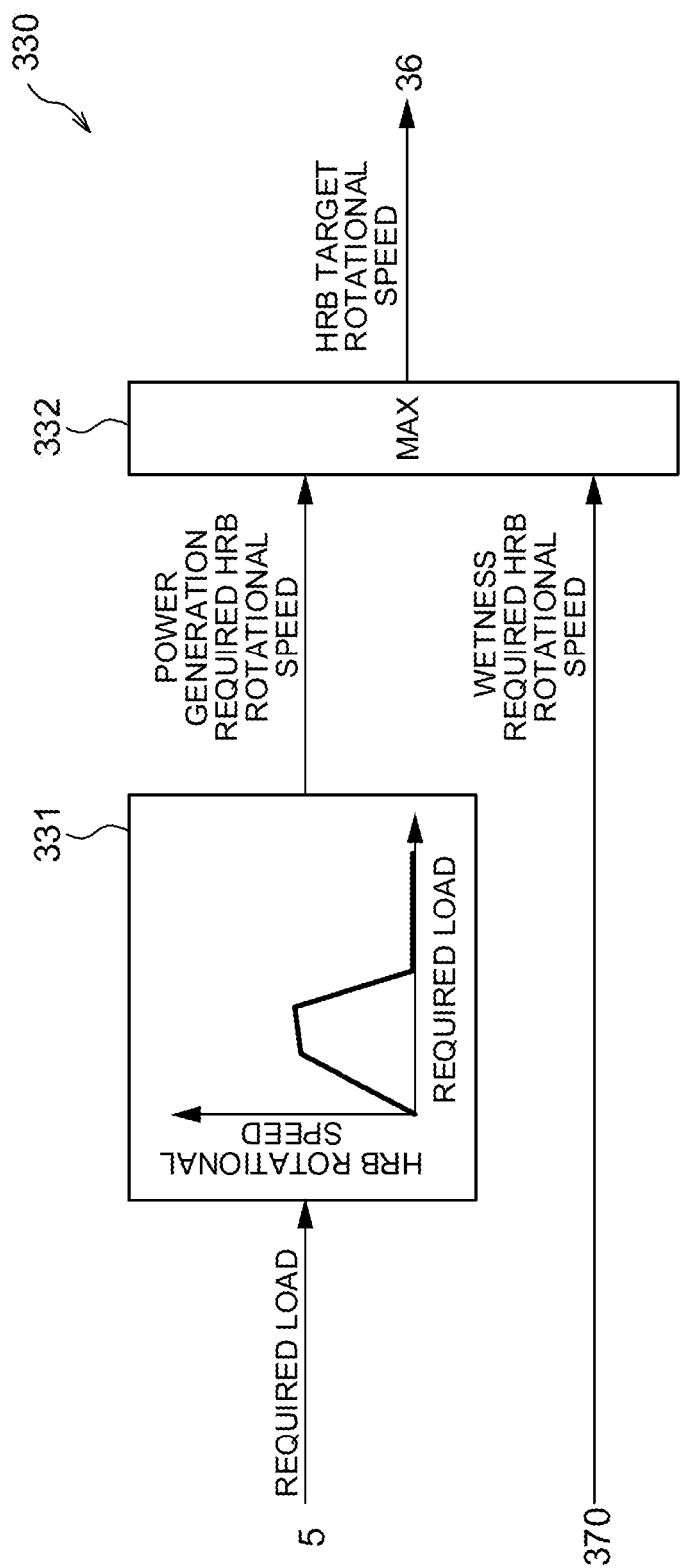
FIG. 18 is a block diagram showing a functional configuration that calculates a target power of the anode circulation pump according to the wetness requirement.

FIG. 18 is a block diagram showing a detailed configuration example of the HRB rotational speed calculation unit 330 in this embodiment.

The HRB rotational speed calculation unit 330 includes a power generation required rotational speed calculation unit 331 and a target rotational speed setting unit 332.

The power generation required rotational speed calculation unit 331 has the same function as the HRB rotational speed calculation unit 230 shown in FIG. 7. A map having the same contents as those of the HRB control map shown in FIG. 7 is stored in the power generation required rotational speed calculation unit 331. The power generation required rotational speed calculation unit 331 acquires a required load from the load device 5 and then refers to the map, thereby calculating a power generation required HRB rotational speed. The power generation required HRB rotational speed is a parameter indicative of a rotational speed of the anode circulation pump 36 that is necessary for power generation of the fuel cell stack 1.

The target rotational speed setting unit 332 sets the greater value of the power generation required HRB rotational speed and the wetness required HRB rotational speed from the membrane wetness FB control unit 370 as a target rotational speed of the anode circulation pump 36.

When the required load is in the high load range in the case where the HFR from the impedance measuring device 6 is greater than the target HFR, i.e. the electrolyte membrane is relatively dry, the wetness required HRB rotational speed becomes greater than the power generation required HRB rotational speed. In such a case, the target rotational speed setting unit 332 sets the wetness required HRB rotational speed as a target rotational speed and outputs the target rotational speed to the anode circulation pump 36. Consequently, the circulation flow rate of an anode discharged gas increases so that the electrolyte membrane tends to be wet.

Figure 19:
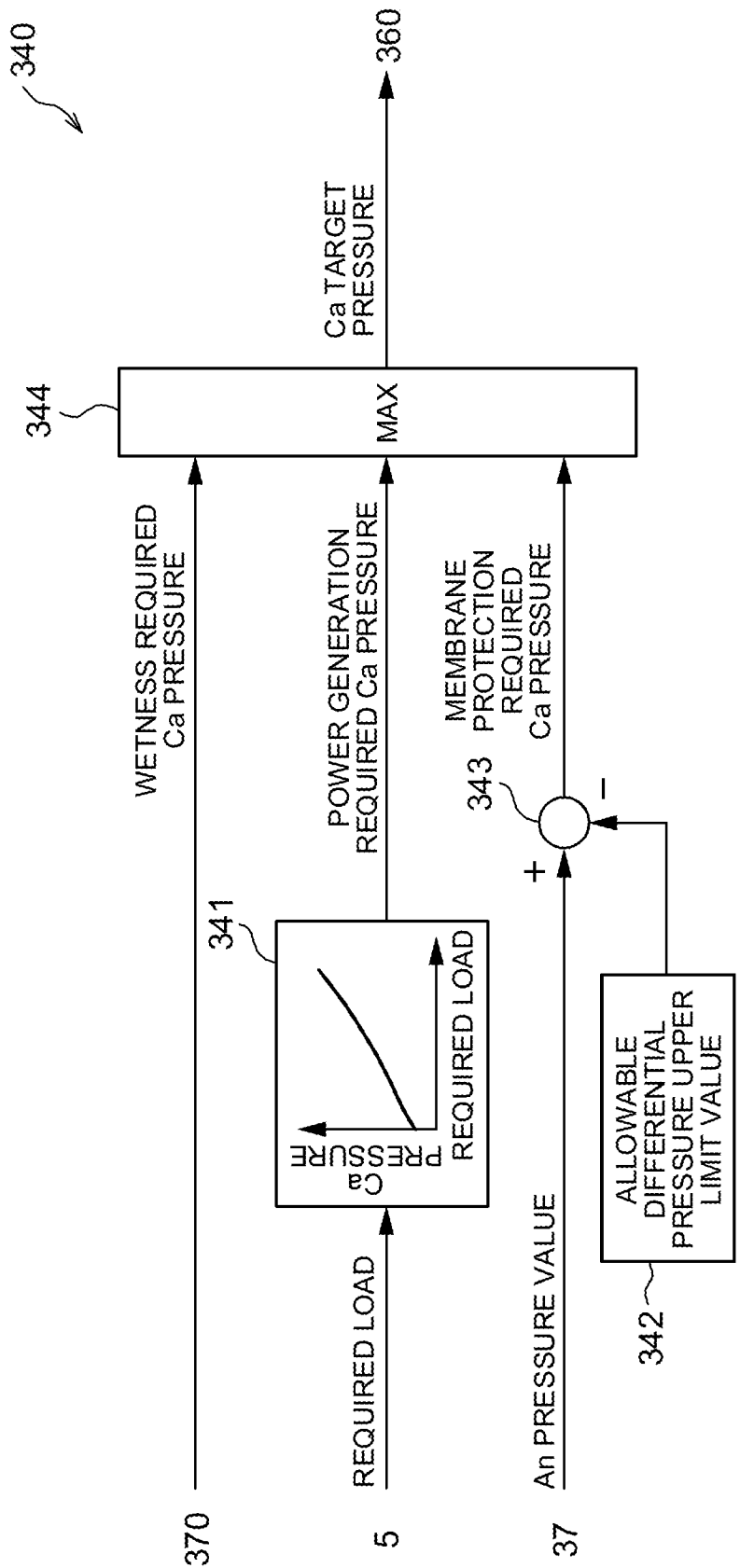
FIG. 19 is a block diagram showing a functional configuration that calculates a target pressure of a cathode gas according to the wetness requirement.

FIG. 19 is a block diagram showing a detailed configuration example of the Ca pressure calculation unit 340 in this embodiment.

The Ca pressure calculation unit 340 includes a power generation required pressure calculation unit 341, an allowable differential pressure value holding unit 342, a membrane protection required pressure calculation unit 343, and a target pressure setting unit 344.

Based on the required load from the load device 5, the power generation required pressure calculation unit 341 calculates a power generation required cathode pressure indicative of a cathode pressure for achieving an oxygen partial pressure that is necessary for power generation of the fuel cell stack 1.

In this embodiment, an oxygen partial pressure control map showing the relationship between a required load to the fuel cell stack 1 and a power generation required cathode pressure is stored in the power generation required pressure calculation unit 341. The power generation required pressure calculation unit 341 acquires a required load from the load device 5 and then refers to the oxygen partial pressure control map, thereby calculating a power generation required cathode pressure associated with the required load.

The oxygen partial pressure control map is set such that the power generation required cathode pressure increases as the required load increases. This is because as the required load increases, the oxygen consumption amount in the electrolyte membrane increases.

The allowable differential pressure value holding unit 342 holds an allowable differential pressure upper limit value that is determined in consideration of the pressure resistance of the electrolyte membrane. The allowable differential pressure upper limit value is equal to the value held in the allowable differential pressure value holding unit 318 in FIG. 13.

The membrane protection required pressure calculation unit 343 subtracts the allowable differential pressure upper limit value from an anode pressure value from the anode pressure sensor 37, thereby calculating a membrane protection required cathode pressure indicative of a cathode pressure that is required for protecting the electrolyte membrane. The membrane protection required pressure calculation unit 343 outputs the membrane protection required cathode pressure to the target pressure setting unit 344.

The target pressure setting unit 344 sets, as a cathode gas target pressure, the greatest value among the wetness required cathode pressure from the membrane wetness FB control unit 370, the power generation required cathode pressure, and the membrane protection required cathode pressure. The target pressure setting unit 344 outputs the cathode gas target pressure to the Ca flow rate/pressure FB control unit 360.

In this way, the Ca pressure calculation unit 340 calculates a target pressure of a cathode gas to be supplied to the fuel cell stack 1 according to the requirements, such as the wetness requirement, the power generation requirement, and the membrane protection requirement, to the fuel cell stack 1. That is, the controller 200 controls the opening degree of the anode pressure control valve 33 according to the operating states, such as the power generation state, the wet/dry state, and the differential pressure state, of the fuel cell stack 1 so that the cathode pressure of the fuel cell stack 1 becomes a cathode gas pressure that is required of the fuel cell stack 1. The equal pressure control pressure calculation unit 323 of the An pressure calculation unit 310 shown in FIG. 13 calculates an equal pressure control anode pressure so that the anode pressure becomes approximately equal to a cathode pressure value from the cathode pressure sensor 25.

Figure 20:
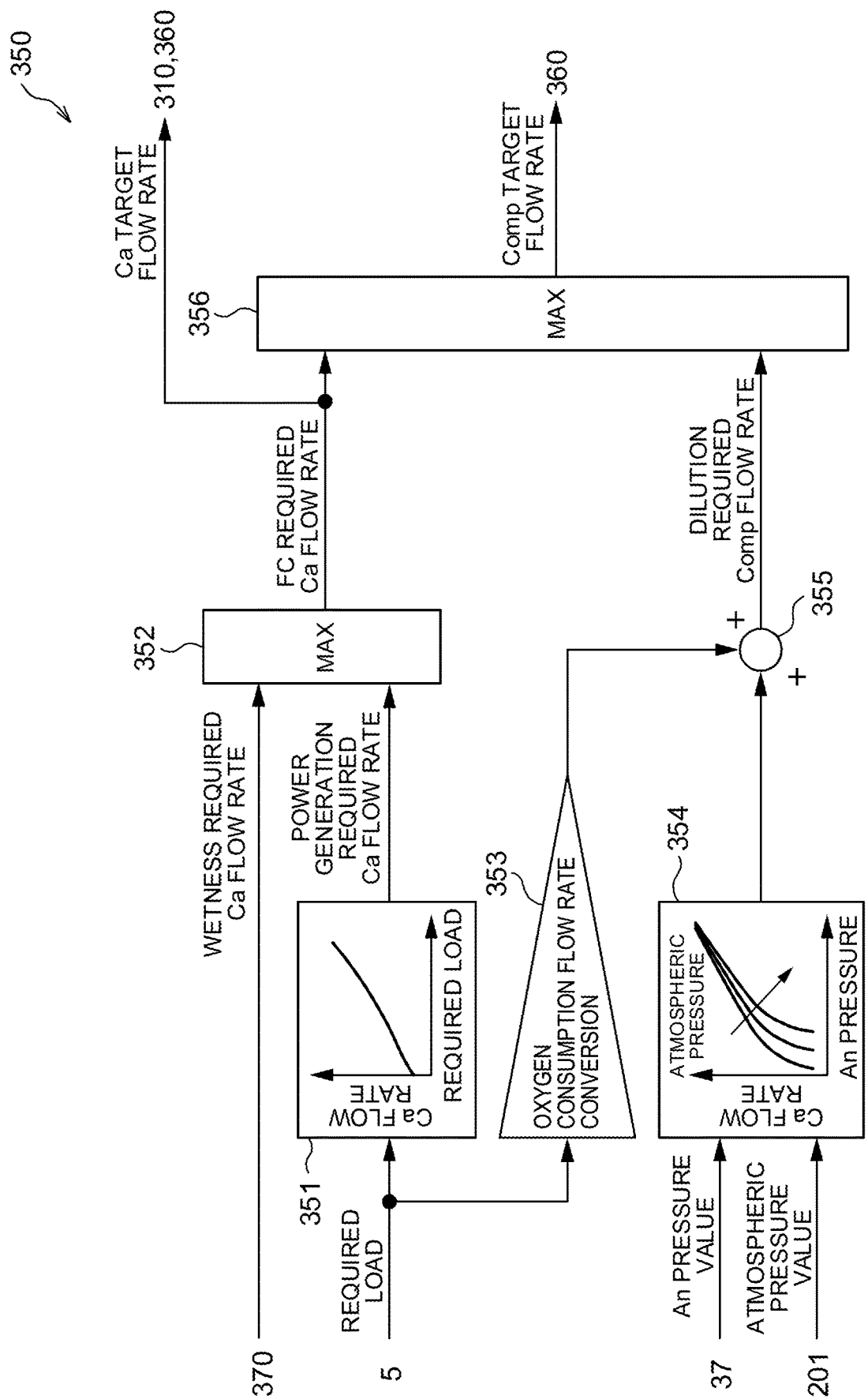
FIG. 20 is a block diagram showing a functional configuration that calculates a target flow rate of the cathode gas according to the wetness requirement.

FIG. 20 is a block diagram showing a detailed configuration example of the Ca flow rate calculation unit 350 in this embodiment.

The Ca flow rate calculation unit 350 includes a power generation required flow rate calculation unit 351, an FC required flow rate setting unit 352, an oxygen consumption amount calculation unit 353, a Ca discharged gas flow rate calculation unit 354, a dilution required flow rate calculation unit 355, and a Comp target flow rate setting unit 356.

The power generation required flow rate calculation unit 351 has the same function as the power generation required flow rate calculation unit 251 shown in FIG. 9. As shown in FIG. 20, a map that is the same as the Ca flow rate control map in FIG. 9 is stored in the power generation required flow rate calculation unit 351. The power generation required flow rate calculation unit 351 acquires a required load from the load device 5 and then refers to the Ca flow rate control map, thereby calculating a power generation required cathode flow rate.

The FC required flow rate setting unit 352 sets the greater value of the wetness required cathode flow rate from the membrane wetness FB control unit 370 and the power generation required cathode flow rate as an FC required cathode flow rate. The FC required cathode flow rate referred to herein is a parameter indicative of a supply flow rate of a cathode gas to the fuel cell stack 1 that is determined by requirements, such as a power generation requirement and a wetness requirement, to the fuel cell stack 1.

The FC required flow rate setting unit 352 outputs the FC required cathode flow rate as a cathode target flow rate to the An pressure calculation unit 310 and the Ca flow rate/pressure FB control unit 360.

The oxygen consumption amount calculation unit 353, the Ca discharged gas flow rate calculation unit 354, and the dilution required flow rate calculation unit 355 respectively have the same functions as the oxygen consumption amount calculation unit 252, the Ca discharged gas flow rate calculation unit 253, and the dilution required flow rate calculation unit 254 shown in FIG. 9. Therefore, description of these configurations herein will be omitted.

The Comp target flow rate setting unit 356 outputs, as a compressor target flow rate, the greater value of the FC required cathode flow rate and the dilution required compressor flow rate to the Ca flow rate/pressure FB control unit 360.

The controller 200 of this embodiment also increases the anode pressure compared to the cathode pressure in the low load range of the fuel cell stack 1 as shown in FIG. 10.

In the An pressure calculation unit 310, as shown in FIG. 10($a$), the HRB required anode pressure exceeds the cathode pressure value in the second to fourth load ranges from the load point $L_1$ to the load point $L_4$. As shown in FIG. 10($d$), the HRB required anode pressure is limited by the Comp required anode pressure in the second load range from the load point $L_1$ to the load point $L_2$.

Consequently, it is possible to increase the anode pressure so that the dilution required compressor flow rate becomes equal to or less than the FC required cathode flow rate. Therefore, the An pressure calculation unit 310 can reduce the electric power consumption of the anode circulation pump 36 while suppressing an increase in the electric power consumption of the compressor 22.

According to the third embodiment of the present invention, the fuel cell system 101 includes the purge valve 39 that discharges impurities contained in an anode discharged gas from the fuel cell stack 1, and the impurity discharge passage 38 and the cathode gas discharge passage 26 that form a passage for diluting a purge gas discharged from the purge valve 39 using a cathode discharged gas from the fuel cell stack 1.

The An pressure calculation unit 310 of the controller 200 controls, based on the cathode target flow rate, the increase amount of the anode gas pressure so that the cathode gas dilution flow rate that is necessary for dilution of a purge gas becomes equal to or less than the flow rate of a cathode discharged gas that is discharged from the fuel cell stack 1.

In this embodiment, the Comp required anode pressure indicative of the upper limit value of the anode pressure at which a purge gas can be diluted only with the cathode discharged gas flow rate from the fuel cell stack 1 is set in the map stored in the Comp required pressure calculation unit 317 of the An pressure calculation unit 310. Therefore, the Comp required pressure calculation unit 317 calculates a Comp required anode pressure according to the map and outputs it to the pressure increase setting unit 321.

Consequently, in the low load range, even when the HRB required anode pressure becomes greater than the cathode pressure to exceed the Comp required anode pressure, the Comp required anode pressure is set as an anode gas target pressure by the pressure increase setting unit 321. Therefore, the anode gas target pressure never takes a value greater than the Comp required anode pressure.

Accordingly, the controller 200 can increase or reduce the increase amount of the anode pressure so that the cathode gas dilution flow rate that is necessary for dilution of a purge gas becomes equal to or less than the cathode discharged gas flow rate of the fuel cell stack 1. Consequently, it is possible to suppress an increase in the electric power consumption of the compressor 22 while reducing the electric power consumption of the anode circulation pump 36.

According to this embodiment, the membrane protection required pressure calculation unit 319 outputs, to the pressure increase setting unit 321, the membrane protection required anode pressure indicative of the value calculated by adding the allowable differential pressure upper limit value to the cathode pressure value. Consequently, in the An pressure calculation unit 310, even when the HRB required anode pressure and the Comp required anode pressure both become greater than the membrane protection required anode pressure, the membrane protection required anode pressure is set as an anode gas target pressure by the pressure increase setting unit 321.

Therefore, the controller 200 can limit the increase amount of the anode pressure so that the inter-electrode differential pressure between the anode pressure and the cathode pressure becomes equal to or less than the allowable differential pressure of the electrolyte membrane. Consequently, while reducing the electric power consumption of the anode circulation pump 36, it is possible to avoid a decrease in power generation performance due to lowering of durability of the electrolyte membrane.

In each of the above-described embodiments, the example in which the anode pressure and the cathode pressure are subjected to equal pressure control so that the inter-electrode differential pressure becomes small in the high load range has been described, but not limited thereto. For example, in the fuel cell system in which the durability of the electrolyte membrane in the fuel cell stack 1 is high, the anode pressure may be controlled to a pressure value that is necessary for power generation of the fuel cell stack 1, as shown in the next figure.

Fourth Embodiment

A controller 200 in a fourth embodiment of the present invention will be described. The configuration of the controller 200 of this embodiment is basically the same as the configuration of the controller shown in FIG. 5, but differs in the settings of a map held in a memory of the An pressure calculation unit 210.

Figure 21:
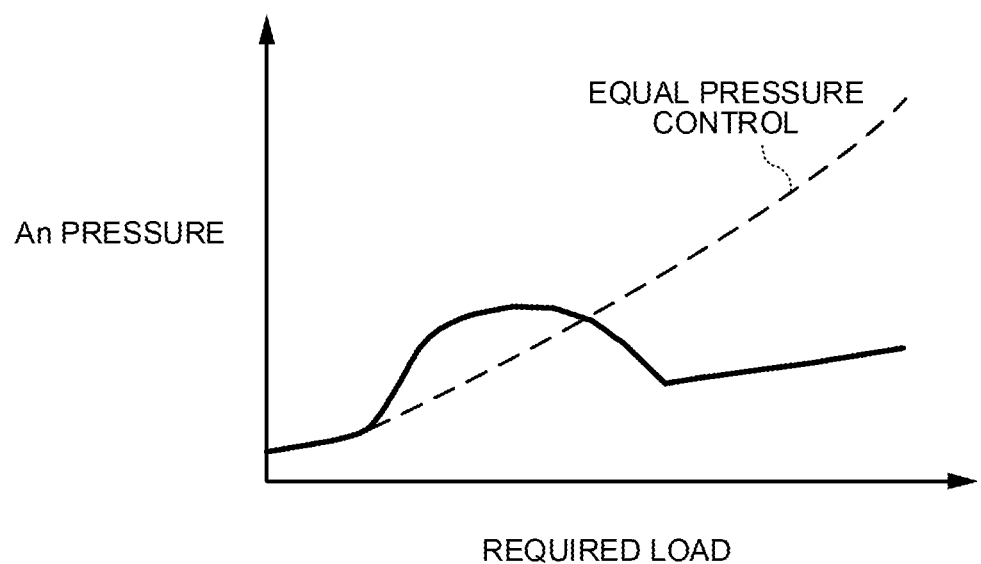
FIG. 21 is a diagram showing one example of a method for controlling the anode gas pressure in a fourth embodiment of the present invention.

FIG. 21 is a diagram showing one example of anode pressure control by the controller 200 in the fourth embodiment of the present invention.

In FIG. 21, the change in the anode pressure when pressure control by the controller 200 of this embodiment is performed is indicated by a solid line, and the change in the anode pressure when equal pressure control is performed at medium-high load is indicated by a broken line.

As shown in FIG. 21, the controller 200 of this embodiment controls the opening degree of the anode pressure control valve 33 so that the characteristics of the anode pressure with respect to the required load has a convex portion in the low load range as indicated by the solid line in FIG. 10(*a*).

In the high load range, differently from the other embodiments, the controller 200 of this embodiment controls the anode pressure to a pressure value that is necessary for power generation of the fuel cell stack 1. Consequently, as indicated by the solid line in FIG. 21, the slope of the anode pressure with respect to the required load becomes small compared to the equal pressure control indicated by the broken line.

For example, the controller 200 holds, in the memory of the An pressure calculation unit 210 shown in FIG. 6, a pressure control map showing the relationship between a required load and an anode gas target pressure as indicated by the solid line in FIG. 21 and controls the anode pressure to a target pressure according to the pressure control map. Taking into account a pressure value that is necessary for power generation of the fuel cell stack 1, the slope of the anode pressure with respect to the required load may be set to zero in the pressure control map.

Alternatively, in the configuration of the An pressure calculation unit 310 shown in FIG. 13, the normal differential pressure value holding unit 322, the equal pressure control pressure calculation unit 323, and the An target pressure setting unit 324 may be omitted, and the output of the pressure increase setting unit 321 may be set as an anode gas target pressure. Even with this configuration, as shown in FIG. 21, in the high load range, the anode pressure gently increases compared to the equal pressure control as the required load increases, or the anode pressure becomes constant.

According to the fourth embodiment of the present invention, the controller 200 of the fuel cell system 100 including the ejector 34 and the anode circulation pump 36 includes the An pressure calculation unit 210 having the memory. The memory of the An pressure calculation unit 210 holds the map in which a value greater than an anode pressure that is necessary for power generation of the fuel cell stack 1 is set as an anode gas target pressure when the load of the fuel cell stack 1 is low compared to when it is high. The controller 200 acquires a required load to the fuel cell stack 1 and then refers to the map, thereby controlling the pressure of an anode gas, that is supplied to the fuel cell stack 1, to a target pressure.

Consequently, in the low load range of the fuel cell stack 1, the controller 200 can set the pressure of an anode gas, that is supplied to the fuel cell stack 1, to be higher than an anode gas pressure value that is necessary for power generation of the fuel cell stack 1, with the simple configuration. Therefore, it possible to reduce the electric power consumption of the anode circulation pump 36 while reducing the calculation load of the controller 200.

Further, according to this embodiment, as shown in FIG. 6, the map of the An pressure calculation unit 210 is set such that the anode gas target pressure increases as the load of the fuel cell stack 1 increases and that the characteristics of the anode gas target pressure has the convex portion in the load range where the load is low.

In this way, like in the second embodiment, in the low load range, by increasing the anode pressure within the range where the dilution required compressor flow rate does not exceed the power generation required cathode flow rate, it is possible to reduce the size of the anode circulation pump 36 while suppressing an increase in the electric power consumption of the compressor 22.

Further, in this embodiment, as shown in FIG. 21, the slope of the anode gas target pressure is set to be smaller than the slope of the cathode gas target pressure in the load range where the load is high.

In this way, by making the anode pressure smaller than the cathode pressure in the high load range, the leak amount of hydrogen that is transmitted from the anode electrode to the cathode electrode through the electrolyte membrane decreases, and therefore, the fuel economy of the fuel cell system 100 can be improved.

Further, the load point $L_2$ at which the lift of the ejector 34 increases as shown in FIG. 10(b) can be moved to, for example, the load point $L_1$. As a result, since the lift of the ejector 34 becomes high in the low load range, the required power of the anode circulation pump 36 becomes small so that it is possible to reduce the electric power consumption of the anode circulation pump 36.

While the embodiments of the present invention have been described above, the above-described embodiments only show part of application examples of the present invention and are not intended to limit the technical scope of the present invention to the specific configurations of the above-described embodiments.

For example, although the example in which the inter-electrode differential pressure between the cathode gas pressure and the anode gas pressure is increased only in the load range from the load point $L_1$ to the load point $L_4$ in the low load range in FIG. 10(a) has been described, when an increase in the electric power consumption of the compressor 22 is small enough, the inter-electrode differential pressure may be increased also in the load range from zero to the load point $L_1$. Even with this configuration, it is possible to reduce the electric power consumption of the anode circulation pump 36.

In this embodiment, the anode gas supply device that supplies an anode gas to the fuel cell stack 1 through the ejector 34 is formed by the anode pressure control valve 33, but it may alternatively be formed by an injector, a pump, or the like.

In this embodiment, as shown in FIGS. 9 and 20, the FC required flow rate and the dilution required compressor flow rate are taken into account when calculating the compressor target flow rate, but a surge avoidance required compressor flow rate that is necessary for avoiding the occurrence of surge of the compressor 22 may further be taken into account.

In this embodiment, as shown in FIG. 19, the wetness requirement, the power generation requirement, and the membrane protection requirement are taken into account when calculating the cathode gas target pressure, but in addition thereto, a component protection requirement that is required for avoiding overheating of components disposed downstream of the compressor 22 may also be taken into account.

The above-described embodiments can be combined as appropriate.

The present application claims a priority based on Japanese Patent Application No. 2016-51472 filed on Mar. 15, 2016, all the contents of which are incorporated hereby by reference.

The invention claimed is:

1. A control method for a fuel cell system including: an anode gas supply device configured to supply an anode gas to a fuel cell; an ejector configured to merge an anode discharged gas, discharged from the fuel cell, with the anode gas to be supplied to the fuel cell; an actuator configured to supply the anode discharged gas to the ejector; and a cathode gas supply device configured to supply a cathode gas to the fuel cell, the control method comprising:
performing a cathode gas control step of controlling a pressure of the cathode gas to be supplied to the fuel cell according to a magnitude of a load that is required of the fuel cell; and
determining if the load is in a predetermined low load range; and
performing, when the load is in the predetermined low load range, an anode gas control step of increasing a differential pressure between the pressure of the cathode gas and a pressure of the anode gas by the anode gas supply device compared to a case where the load is not in the predetermined low load range.

2. The control method for the fuel cell system according to claim 1, wherein:
the predetermined low load range is a range in which a pressure increase amount of the anode discharged gas by the actuator takes a peak value; and
the anode gas control step increases the pressure of the anode gas compared to the pressure of the cathode gas in the predetermined low load range.

3. The control method for the fuel cell system according to claim 2, wherein the anode gas control step reduces the pressure of the anode gas to the pressure of the cathode gas when the load is outside the predetermined low load range.

4. The control method for the fuel cell system according to claim 1, wherein:
the fuel cell system includes:
a purge valve configured to discharge an impurity contained in the anode discharged gas from the fuel cell; and
a gas passage for diluting a purge gas discharged from the purge valve with a cathode discharged gas from the fuel cell;
the anode gas control step calculates a target flow rate of the cathode gas to be supplied to the fuel cell; and
the anode gas control step increases the pressure of the anode gas according to the target flow rate of the cathode gas within a range where a cathode gas flow rate that is necessary for diluting the purge gas becomes equal to or less than a flow rate of the cathode discharged gas that is discharged from the fuel cell.

5. The control method for the fuel cell system according to claim 4, wherein the anode gas control step suppresses an increase in the pressure of the anode gas as the load decreases in the predetermined low load range.

6. The control method for the fuel cell system according to claim 1, wherein the anode gas control step controls the pressure of the anode gas based on an allowable differential pressure of an electrolyte membrane in the fuel cell so that the differential pressure between the pressure of the anode gas and the pressure of the cathode gas becomes equal to or less than the allowable differential pressure.

7. The control method for the fuel cell system according to claim 2, wherein the predetermined low load range is a load range where a circulation amount of the anode gas by the ejector becomes insufficient compared to a circulation amount that is determined by the load.

8. The control method for the fuel cell system according to claim 2, wherein:
the fuel cell system includes:
a purge valve configured to discharge an impurity contained in the anode discharged gas from the fuel cell; and
a gas passage for diluting a purge gas discharged from the purge valve with a cathode discharged gas from the fuel cell; and
the predetermined low load range is a load range where the purge gas can be diluted using the cathode gas that is supplied to the fuel cell.

9. The control method for the fuel cell system according to claim 1, wherein the anode gas control step reduces the differential pressure as a temperature of the fuel cell or the pressure of the cathode gas increases.

10. A control device for a fuel cell system including: an ejector configured to merge an anode discharged gas, discharged from a fuel cell, with an anode gas to be supplied to the fuel cell; and an actuator configured to supply the anode discharged gas to the ejector,
the control device comprising:
a memory holding a map in which a value greater than an anode gas pressure that is necessary for power generation of the fuel cell is set as a target pressure of the anode gas when a load of the fuel cell is in a predetermined low load range; and
a control unit configured to, when a required load to the fuel cell is acquired, refer to the map and control a pressure of the anode gas, that is supplied to the fuel cell, to the target pressure.

11. The control device for the fuel cell system according to claim 10, wherein the map is set such that the target pressure increases as the load increases and that the target pressure has a convex portion in the predetermined low load range.

12. A fuel cell system comprising:
a cathode gas supply device configured to supply a cathode gas to a fuel cell;
a pressure control valve configured to adjust a pressure of an anode gas to be supplied to the fuel cell;
an ejector configured to merge an anode discharged gas, discharged from the fuel cell, with the anode gas to be supplied to the fuel cell;
an actuator configured to supply the anode discharged gas to the ejector; and
a control device configured to control power generation of the fuel cell according to a load connected to the fuel cell,
wherein the control device is configured to increase a ratio of a manipulated variable of the pressure control valve to a manipulated variable of a cathode gas pressure by the cathode gas supply device when the load is in a predetermined low load range.

* * * * *